United States Patent

Monier

Patent Number: 5,745,398
Date of Patent: Apr. 28, 1998

[54] METHOD FOR THE IMPLEMENTATION OF MODULAR MULTIPLICATION ACCORDING TO THE MONTGOMERY METHOD

[75] Inventor: Guy Monier, Rognac, France

[73] Assignee: SGS-Thomson Microelectronics S.A., Saint Genis, France

[21] Appl. No.: 545,408

[22] Filed: Nov. 7, 1995

[30] Foreign Application Priority Data

Nov. 8, 1994 [FR] France .................................. 94 13594

[51] Int. Cl.$^6$ ...................................................... G06F 7/52
[52] U.S. Cl. ........................................... 364/746.1; 380/30
[58] Field of Search ............................. 364/746, 746.1, 364/754, 937.4; 380/30

[56] References Cited

U.S. PATENT DOCUMENTS

| | | | |
|---|---|---|---|
| 5,073,870 | 12/1991 | Morita ................................. | 364/746 |
| 5,261,001 | 11/1993 | Dariel et al. ......................... | 380/30 |
| 5,448,639 | 9/1995 | Arazi ................................... | 380/302 |
| 5,513,133 | 4/1996 | Cressel et al. ....................... | 364/754 |

FOREIGN PATENT DOCUMENTS

| | | | | |
|---|---|---|---|---|
| A-0 566 498 | 10/1993 | European Pat. Off. | ......... | H04L 9/32 |
| A-0 601 907 | 6/1994 | European Pat. Off. | ......... | G06F 7/72 |

OTHER PUBLICATIONS

French Search Report from French Patent Application 94 13594, filed Nov. 8, 1994.
Algebraic Coding, First French–Israeli Workshop Proceedings, First French–Israeli Workshop, Algebraic Coding, Paris, France, 19–21 Jul 1993, ISBN 3-540-5784309, 1994, Berlin, Germany, Springer–Verlag, Germany, pp. 75–81, Naccache D. et al., "Montgomery–Suitable Cryptosystems".

Advances in Cryptology–Auscrypt '92, Workshop on the Theory and Application of Cryptographic Techniques Proceedings, Gold Coast, QLD., Australia, 13–16 Dec. 1992, ISBN 3-540-57220-1, 1993 Berlin, Germany, Springer–Verlag, Germany, pp. 505–516, Sauerbrey J., "A Modular Exponentiation Unit Based on Systolic Arrays".

Advances in Cryptology–Eurocrypt '90, Workshop on the Theory and Application of Crytographic Techniques Proceedings, AARHUS, Denmark, 21–24 May 1990, ISBN 3-540-53587-X, 1991 Berlin, Germany, Springer–Verlag, Germany pp. 230–244, Duxse S.R. et al., "A Cryptographic Library for the Motorola DSP56000".

*Primary Examiner*—Thomas H. Tarcza
*Assistant Examiner*—Pinchus M. Laufer
*Attorney, Agent, or Firm*—Wolf, Greenfield & Sacks, P.C.; James H. Morris

[57] ABSTRACT

A method for the implementation of modular multiplication according to the Montgomery method, wherein a multiplicand A and a multiplier B are encoded respectively on a and b words of k bits, the most significant words of A and B being non-zero, a modulo N is encoded on m words of k bits, the modulo having (m–m') most significant words with k zero bits, with 0<m'<m. The method includes steps of multiplication in a multiplication circuit having a serial input to receive data elements encoded on at least m' words of k bits, a parallel input to receive encoded words of k bits, and a serial output, wherein, during the performance of the multiplication, a predetermined number p of words is given successively to the parallel input of the multiplication circuit, p being independent of m and greater than or equal to the number a.

15 Claims, 16 Drawing Sheets

FIG. 3A

| FIG. 3A(1) |
|---|
| FIG. 3A(2) |

FIG. 3A(1)

50 — production of an error correction parameter $H = 2^{(a+b) \cdot k} \bmod N$ having a useful size smaller than or equal to m', and a parameter $J_0$ encoded on k bits, with $J_0 = -N_0^{-1} \bmod 2^k$, $N_0$ being the least significant bit of the modulo N, and storage of $J_0$ in a k-bit register 17

51 — loading of the parameter H into the register 10 and of the modulo N into the register 12, and initialization of the register 11 having $n = m \cdot k$ bits at zero, the contents of this register 11 being denoted S, with S as a variable binary data element encoded on n bits 52 — setting up of a loop, indexed by i, with i varying from 1 to a, each $i^{th}$ iteration comprising the following operations:

53 — transfer of the $i^{th}$ word $A_{i-1}$ of the multiplicand A from the register 16 to the storage flip-flop circuit 21

54 — production of a value $X(i) = S(i-1) + H \cdot A_{i-1}$ with $S(0) = 0$ (n bits at zero) and $S(i-1)$ as the updated value of S 55 — multiplication of the least significant word of X(i), $X_0(i)$ by $J_0$ in the multiplication circuit 20, and entering of the value $X_0(i) \cdot J_0 \bmod 2^k = Y_0(i)$ into the register 18, and simultaneously the delaying of N and X(i) by k cycles in the delay circuits 32 and 34

- 56: computation of a value $Z(i) = X(i) + Y_0(i) * N$ by multiplying $Y_0(i)$ by N, delayed by k cycles, in the multiplication circuit 20, and by adding $X(i)$ to the value $Y_0(i) * N$, bit by bit in the addition circuit 31

- 57: not taking account of the least significant word of $Z(i)$ and storing the remaining words, namely $Z(i)/2^k$, in the register 11

- 58: comparing $Z(i)/2^k$ with N, bit by bit, in order to determine the updated value $S(i)$ of the next iteration in the manner described here above, this comparison being made by the bit-by-bit subtraction of $Z(i)/2^k$ and N in the subtraction circuit 29, N having been delayed by k additional cycles in the delay circuit 33

- 59: loading the $i^{th}$ word of the multiplicand A into the register 16 at any point in time during the above operations

- 60: at the $a^{th}$ iteration, ignoring the least significant word of $Z(a)$ and entering the remaining words, i.e. $Z(a)/2^k = A * 2^{b*k} \bmod N$ into the register 10

- 61: repeating the steps 52 and 60 in which B is substituted for A, and $Z(m)/2^k$ or $(Z(m)/2^k) - N$ is given by means of a third serial subtraction circuit 27 to the multiplication circuit 19, with i varying from 1 to b

- 62: output of the result stored in the register 10 at the last iteration, possibly subtracted from N if necessary, by means of the subtraction circuit 27

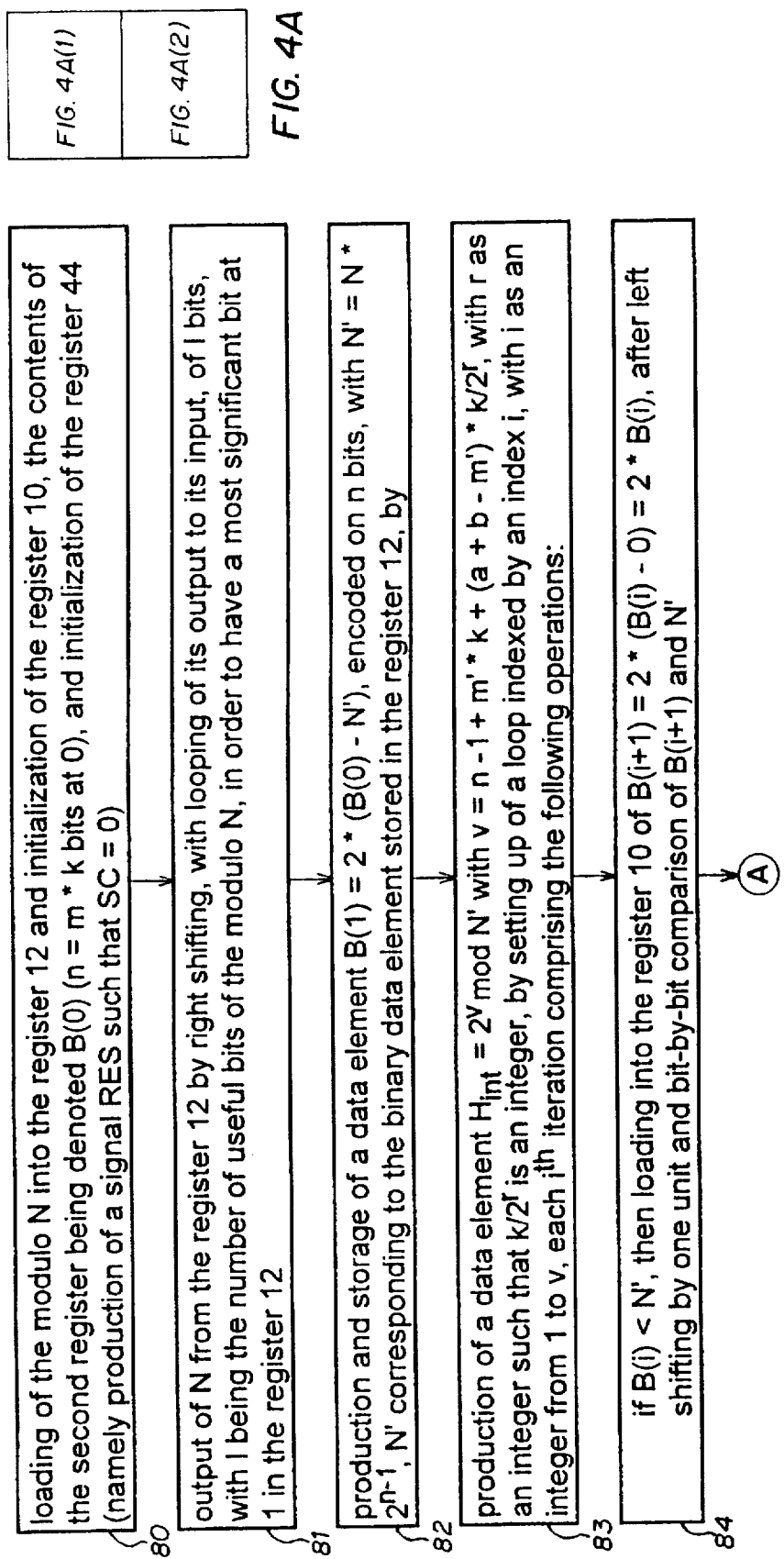

FIG. 4A(1)

80 — loading of the modulo N into the register 12 and initialization of the register 10, the contents of the second register being denoted B(0) ($n = m * k$ bits at 0), and initialization of the register 44 (namely production of a signal RES such that SC = 0)

81 — output of N from the register 12 by right shifting, with looping of its output to its input, of $l$ bits, with $l$ being the number of useful bits of the modulo N, in order to have a most significant bit at 1 in the register 12

82 — production and storage of a data element $B(1) = 2 * (B(0) - N')$, encoded on n bits, with $N' = N * 2^{n-l}$, N' corresponding to the binary data element stored in the register 12, by 83 — production of a data element $H_{int} = 2^v \bmod N'$ with $v = n - 1 + m' * k + (a + b - m') * k/2^r$, with r as an integer such that $k/2^r$ is an integer, by setting up of a loop indexed by an index i, with i as an integer from 1 to v, each i$^{th}$ iteration comprising the following operations:

84 — if $B(i) < N'$, then loading into the register 10 of $B(i+1) = 2 * (B(i) - 0) = 2 * B(i)$, after left shifting by one unit and bit-by-bit comparison of $B(i+1)$ and N'

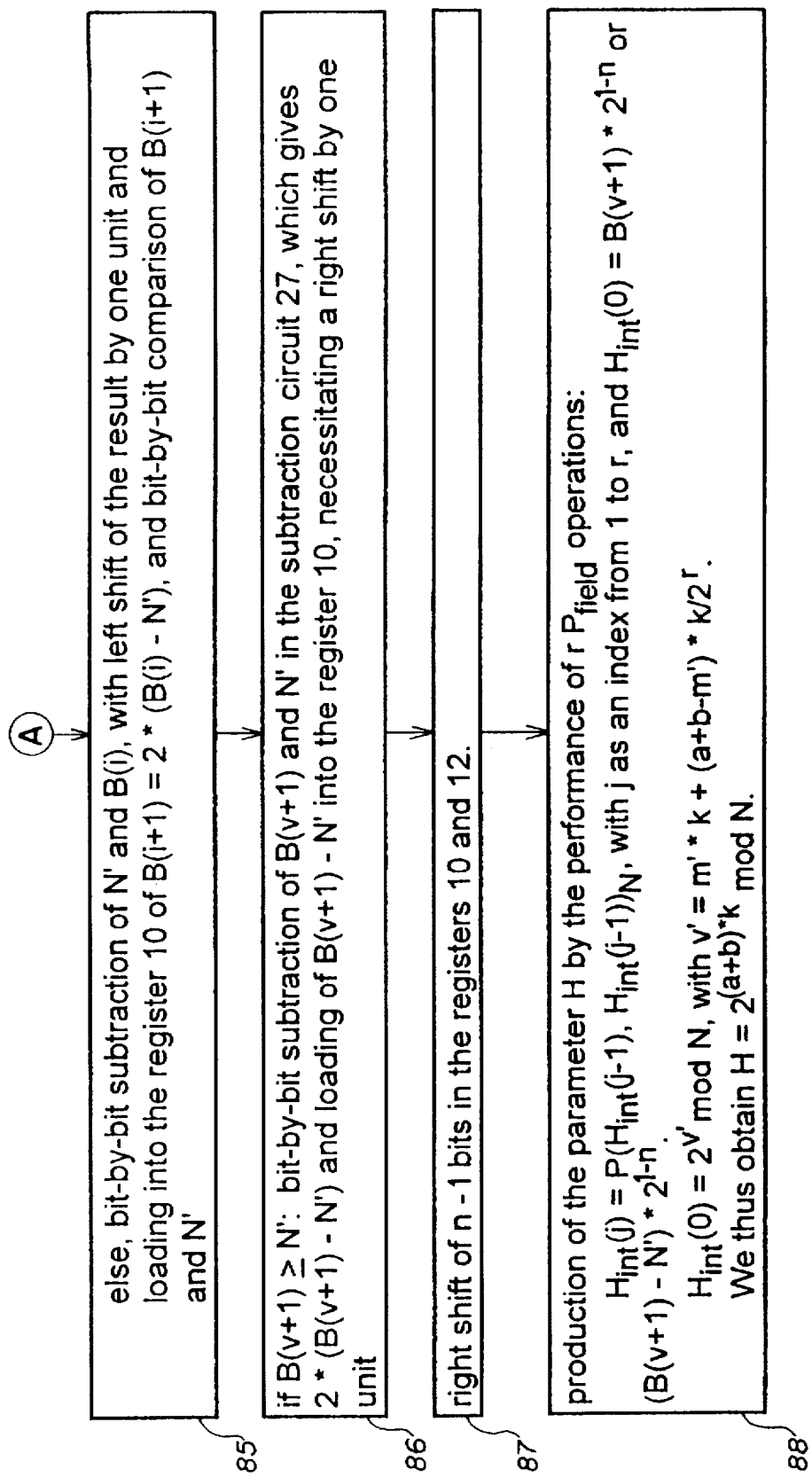
FIG. 4A(2)

FIG. 5

| FIG. 5A |
|---------|
| FIG. 5B |

100 — let j = 1,

101 — Production of a parameter $J_0$ encoded on k bits, with $J_0 = -N_0^{-1} \bmod 2^k$, $N_0$ being the least significant word of the modulo N, and storage of $J_0$ in the k-bit register 17

102 — Initialization of the register 11 of $n = m * k$ bits at zero, the contents of this register 11 being referenced S, with S as a variable binary data element encoded on n bits

103 — Setting up of a loop, indexed i, with i varying from 1 to m', each $i^{th}$ iteration comprising the following operations:

104 — transfer of the $i^{th}$ word $H_{i-1}$ of the multiplicand $H_{int}(j-1)$ from the register 16 to the storage flip-flop circuit 21

105 — production of a value $X(i) = S(i-1) + H * H_{i-1}$ with $S(0) = 0$ and $S(i-1)$ as the so-called updated value of S,

106 — multiplication of the least significant word of $X(i)$, $X_0(i)$, by $J_0$ in the multiplication circuit 20, and entering the value $X_0(i) * J_0 \bmod 2^k = Y_0(i)$ into the register 18, and simultaneously delaying N and $X(i)$ by k cycles in the delay circuits 32 and 34,

| FIG. 7A(1) | FIG. 7A(2) |

130 — production of the error correction parameter H and of a parameter $J_0$ encoded on k bits, and storage of J0 in the register 17

131 — loading of the multiplier B and of the modulo N respectively into the registers 10 and 12, and initialization of the register 11 at zero, the contents of this register 11 being denoted S 132 — setting up of a loop, indexed by i, with i varying from 1 to a, each $i^{th}$ iteration comprising the following operations:

133 — transfer of the $i^{th}$ word $A_{i-1}$ of the multiplicand A from the register 16 to the storage flip-flop circuit 21, 134 — production of a value $X(i) = S(i-1) + B * A_{i-1}$ with $S(0) = 0$ and $S(i-1)$ as the so-called updated value of S, defined hereinafter 135 — multiplication of the least significant word of $X(i)$, $X_0(i)$ by $J_0$, and entering of the value $X_0(i) * J_0 \mod 2^k = Y_0(i)$ into the register 18, and simultaneously the delaying of N and $X(i)$ by k cycles

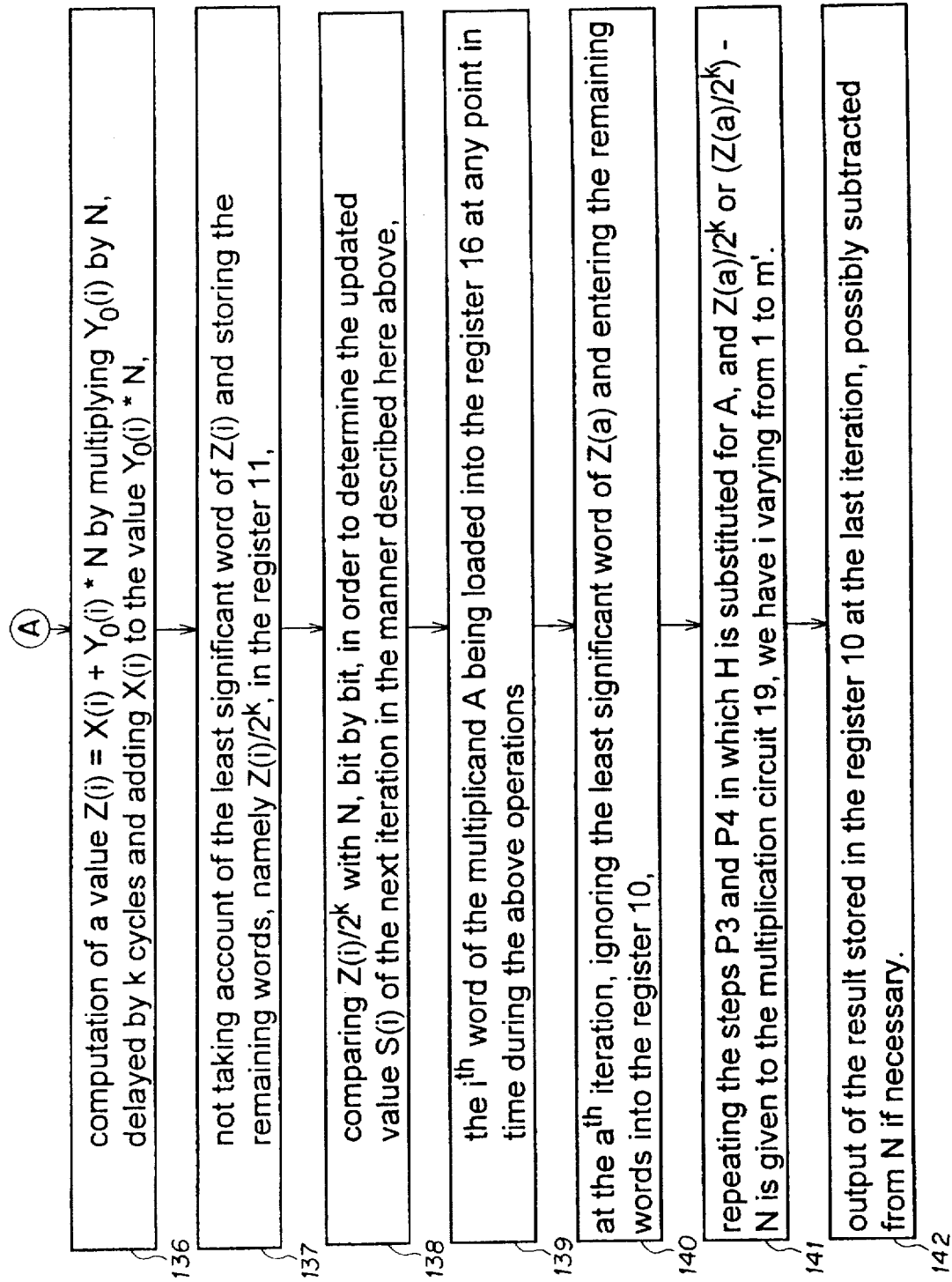
FIG. 7A(2)

| FIG. 8A |
|---|
| FIG. 8B |

FIG. 8

160 — loading of the modulo N into the register 12, and initialization of the register 10 at zero, the contents of the register 10 being denoted B(0), 161 — right shift, with looping of its output to its input, of l bits of the register 12, with l being the number of useful bits of the modulo, 162 — production and storage of a data element $B(1) = 2 * (B(0) - N')$, encoded on n bits, with $N' = N * 2^{n-1}$, by:

163 — right shifting in the two registers and bit-by-bit subtraction of the contents of the registers, with left shift by one unit of the result, denoted R(0), of the bit-by-bit subtraction, 164 — loading of the result of the subtraction after shifting, denoted B(1), into the register 10

165 — production of a data element $H_{int} = 2^v \bmod N'$ with $v = n - l + m' * k + a * k/2^r$, with r as an integer such that $k/2^r$ is an integer, by setting up a loop indexed by an index i, with i as an integer from 1 to v, each $i^{th}$ iteration comprising the following operations:

METHOD FOR THE IMPLEMENTATION OF MODULAR MULTIPLICATION ACCORDING TO THE MONTGOMERY METHOD

BACKGROUND OF THE INVENTION

1. Field of the Invention

The invention relates to a method for the implementation of modular multiplication according to the Montgomery method. This method makes it possible to carry out modular computations in a finite field (or Galois field) denoted GF(2") without the performance of divisions.

2. Discussion of the Related Art

Conventionally, modular operations on GF(2") are used in cryptography for applications such as authentication of messages, identification of a user and exchange of keys. Such exemplary applications are described, for example, in the French patent application published under No. 2 679 054.

There are commercially available integrated circuits dedicated to such applications. These include, for example the product referenced as ST16CF54 manufactured by SGS-THOMSON MICROELECTRONICS S.A., built around an association of the type comprising a central processing unit and an arithmetic coprocessor and dedicated to the performance of modular computations. The coprocessor used enables the processing of modular multiplications by using the Montgomery method. It is the object of a European patent application filed under the reference No. 0 601 907 A2, and is illustrated in FIG. 1 (this figure corresponds to FIG. 2 of the European patent application referred to).

The basic operation, called a $P_{field}$ operation, consists of the production, on the basis of three binary data elements A (multiplicand), B (multiplier, which is smaller than N) and N (modulo) encoded on an whole number of bits n, of a binary data element denoted $P(A, B)_N$ encoded on n bits, such that $P(A, B)_N = A*B*I \mod N$, with $I=2^{-n} \mod N$. For this purpose, it is assumed that the data elements are encoded on m words of k bits, with $m*k=n$, and the words of A and B are given to a multiplication circuit having a serial input, a parallel input and a serial output.

In the coprocessor described in the European patent application referred to, we have $k=32$ and $m=8$ or $16$.

From this viewpoint, the circuit illustrated in FIG. 1 is used to implement a method including the following steps:

1. Computation of a parameter H ($H=2^{2*n} \mod N$) and a parameter $J_0$ encoded on k bits, with $J_0=-N_0^{-1} \mod 2^k$, $N_0$ being the least significant bit of the modulo N, and storage of $J_0$ in a k-bit register 17.

2. Loading of the multiplier B and of the modulo N in respective n-bit registers 10 and 12, with $n=m*k$, and initialization of an n-bit register 11 at zero, the contents of this register being denoted S, with S as a variable binary data element encoded on n bits.

3. Setting up a loop, indexed i, with i varying from 1 to m, each $i^{th}$ iteration comprising the following steps:

a) the transfer of the $i^{th}$ word $A_{i-1}$ of the multiplicand A from a register 16 to a storage flip-flop circuit 21, b) the production of a value $X(i)=S(i-1)+B*A_{i-1}$ with $S(0)=0$ and $S(i-1)$ as the so-called updated value of S, defined hereinafter, by:

I—making a right shift of the contents of the register 10 to the input of a first serial-parallel multiplication circuit 19 with the looping of the output of the register 10 to its input;

II—multiplying the bits of B by $A_{i-1}$;

III—making a right shift of the contents of the register 12, with looping of the output to the input;

IV—determining the updated value of S(i−1) as being the value stored in the register 11 after the $(i−1)^{th}$ iteration if this updated value is smaller than N and, if this updated value is greater than N, making a serial subtraction of N from this updated value in a first serial subtraction circuit 28, the value that results therefrom being the updated value of S(i−1); and V—making a right shift of the contents of the register 11 and carrying out a bit-by-bit addition of the value of the multiplication $B*A_{i-1}$ to the updated value of S(i−1) in a first serial addition circuit 30.

c) multiplication of the least significant word of X(i), $X_0(i)$, by $J_0$ in a second serial-parallel multiplication circuit 20, and entering the value $X_0(i)*J_0 \mod 2^k = Y_0(i)$ into a register 18, and simultaneously delaying N and X(i) by k cycles in delay circuits 32 and 34;

d) computation of a value $Z(i)=X(i)+Y_0(i)*N$ by:

I—multiplying $Y_0(i)$ by N, delayed by k cycles, in the second multiplication circuit 20; and II—adding X(i) to the value $Y_0(i)*N$ in a second serial addition circuit 31.

e) not taking account of the least significant word of Z(i) and storing the remaining words, namely $Z(i)/2^k$, in the register 11.

f) making a bit-by-bit comparison of $Z(i)/2^k$ with N in order to determine the updated value S(i) of the next iteration, in the manner described here above, this comparison being done through the bit-by-bit subtraction of $Z(i)/2^k$ and N in a second serial subtraction circuit 29, N having been delayed by k additional cycles.

g) the $i^{th}$ word of the multiplicand A being loaded into the register 16 at any instant during the above operations.

4. At the $m^{th}$ iteration, ignoring the least significant word of Z(m) and entering the remaining words, namely $Z(m)/2^k$, into the register 10.

5. Repeating the steps 3 and 4 in which $Z(m)/2^k$ is substituted for B and H for A, and $Z(m)/2^k$ or $(Z(m)/2^k)-N$ is given by means of a third serial subtraction circuit 27 to the multiplication circuit 19 (if $Z(m)/2^k > N$).

6. Output of the result stored in the register 10 at the last iteration, possibly subtracted from N if necessary.

On the whole, if the period of the clock signal synchronizing the operation of the circuit of FIG. 1 is called a cycle, then the time needed for the processing of a modular multiplication can be broken down chiefly into:

$n*(n+1)$ cycles for the computation of H, n cycles for the step 2, $m*(n+2*k+x)$ cycles for the combined steps 3 and 4 on the one hand and for the step 5 on the other hand with x as an integer, n cycles for the step 6.

In practice, x is a function of the initialization of the circuit, i.e. chiefly of the setting up of the control signals (of multiplexers for example) to ensure the consistent operation of the circuit. In practice, it may be considered for example that x=7.

With regard to the first step, the computation of parameter $J_0$ is done by the central processing unit (software method).

It can be shown that H is a function of the size of the register 16 and of the number of times in which this register is used in a loop. We have $H=2^{2*n} \mod N$. This parameter is an error correction parameter. Indeed the step 4 produces a result having the form $A*B*I$, with $I=2^{-n} \mod N$. We have $H*I^2=1$ mod N. This enables a precise result to be given, namely a result equal to the result of the modular multiplication $A*B$ mod N, during the step 7 of the modular multiplication method described here above.

Furthermore the computation of H is done by means of the coprocessor, according to the following method described with reference to FIG. 2 which corresponds to FIG. 9 of the European patent application referred to.

To compute H, the following operation is performed (see also page 20, line 47 to page 25, line 52 of the above-mentioned European patent):

1. loading of N in the register 12 and initializing of the register 10 at B(0)=0, 2. simultaneously:

right shift and bit-by-bit subtraction of B(0) and N in a serial subtractor 27 with a left shift by one unit of the result $R(0)=B(0)-N$ mod $2^n$, the shift being done in the subtractor in putting out a first bit at 0, loading of $B(1)=2*R(0)$ in the register 10, bit-by-bit subtraction of $2*R(0)$ and N to determine whether $2*R(0)$ is > or <N, this subtraction being done in a second subtractor 40, with the testing, in a circuit 44, of the result of the subtraction, 3. setting up of a loop with an index i, with i ranging from 1 to n, each iteration comprising the following operations:

if B(i)<N then loading of $B(i+1)=2*(B(i)-0)$ in the registers 10, else loading of $B(i+1)=2*(B(i)-N)$ in the register 10.

We have $B(n+1)=H=2^{2*n}$ mod N.

The inventor has sought to improve the implementation of the modular multiplication by the coprocessor shown in FIG. 1, on the one hand in order to reduce the periods of time needed for the this multiplication to take place and, on the other hand, to extend the computational possibilities of the circuit.

SUMMARY OF THE INVENTION

Thus, the invention provides a method for the implementation of modular multiplication according to the Montgomery method, wherein a multiplicand A and a multiplier B are encoded respectively on a and b words of k bits, the most significant words of A and B being non-zero, a modulo N is encoded on m words of k bits, the modulo having (m-m') most significant words with k bits at zero, with $0<m'\leq m$, comprising steps of multiplication in a multiplication circuit having a serial input to receive data elements encoded on at least m' words of k bits, a parallel input to receive encoded words of k bits and a serial output wherein, during the performance of the multiplication, a predetermined number p of words is given successively to the parallel input of the multiplication circuit, p being independent of m and greater than or equal to the number a.

The existing circuit uses a fixed type of encoding of the data elements (multiplicand, multiplier and modulo), namely one that is independent of the values of these data elements. Indeed, the data elements considered are data elements encoded on a fixed size of m*k bits. This gives rise to the performance of unnecessary operations if the operands have most significant words of k bits equal to zero, especially with respect to the multiplicand. The invention makes it possible to envisage reducing the number of operations and, more particularly, the number of uses of the register 16. It furthemore enables the implementation of modular multiplication, whatever may be the size of the multiplicand in bits.

Advantageously, the invention proposes a method wherein:

$H=2^{(a+b)*k}$ mod N is produced, an intermediate data element encoded on m words of k bits is produced by giving the m words of H and the a words of A respectively to the serial input and to the parallel input of the multiplication circuit, and $A*B$ mod N is produced by giving the m words of the intermediate data element and the b words of B respectively to the serial input and to the parallel input of the multiplication circuit.

Thus, it would be possible to carry out operations on operands (i.e. multiplicands and multipliers) of any size. In particular, both these operands could be encoded on a number of words greater than m or greater than the modulo.

The invention also proposes the following, with B being smaller than or equal to N:

the producing of $H=2^{(a+m')*k}$ mod N, the producing of an intermediate data element encoded on m words of k bits by giving m words, corresponding to B encoded on mn words of k bits, and the a words of A respectively to the serial input and to the parallel input of the multiplication circuit, and the producing of $A*B$ mod N by giving the m words of the intermediate data element and the m' least significant words of H respectively to the serial input and to the parallel input of the multiplication circuit.

The invention also proposes a method wherein (a+b) and m' are compared, and

If a+b<m', then $A*B$ mod N is produced by giving m words, corresponding to $B* 2^{a*k}$ encoded on m words, and the a words of A respectively to the serial input and to the parallel input of the multiplication circuit.

if a+b=m' then $B*2^{a*k}$ and N are compared, and if $B*2^{a*k}<N$, then $A*B$ mod N is produced by giving m words, corresponding to $B *2^{a*k}$ encoded on m words, and the a words of A respectively to the serial input and to the parallel input of the multiplication circuit.

else $A*B$ mod N is produced by giving m words, corresponding to $B*2^{a*k}$ mod N encoded on m words, and the a words of A respectively to the serial input and to the parallel input of the multiplication circuit.

This it would be possible, in certain cases, to carry out a modular multiplication without having to compute any error correction parameter H.

BRIEF DESCRIPTION OF THE DRAWINGS

The invention will be understood more clearly and other features and advantages shall appear from the following description of embodiments of the invention. This description is given as an indication that in no way restricts the scope of the invention, and is to be read in conjunction with the appended drawings, of which:

FIGS. 3A and 3B are flow charts describing how the circuit of FIG. 1 is used in one embodiment of the present invention;

FIGS. 4 and 4A through 4B illustrate another embodiment of the present invention;

FIGS. 5, 5A and 5b are a flowchart describing the implementation of the $P_{field}$ operations.

FIGS. 7 and 7A through 7B illustrate yet an additional embodiment of the present invention; and FIGS. 8, 8a–8b illustrate yet an additional embodiment of the present invention.

DETAILED DESCRIPTION

Figure 1:
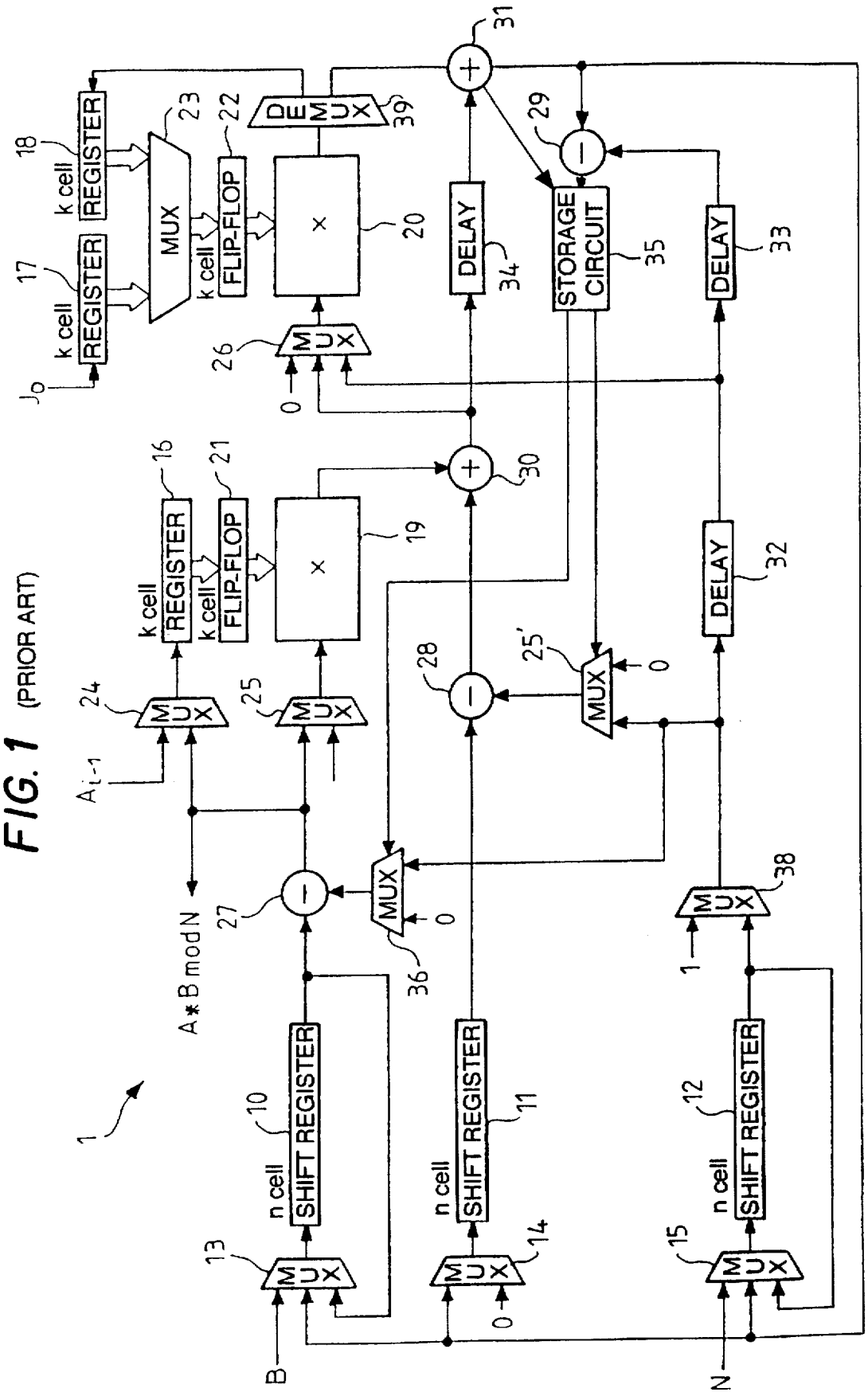
FIG. 1 gives a schematic view of a circuit enabling the implementation of a modular multiplication operation according to the Montgomery method.

FIG. 1 shows a circuit 1 for the processing of modular operations.

This circuit comprises:

A) three shift registers 10, 11 and 12 with serial input and output. Each of these registers has a same number n of cells, with n=m*k. These registers could be such that they can be subdivided, for example into registers of n/2 cells and into registers of k bits for the registers 10 and 12.

B) multiplexers 13, 14 and 15 are placed respectively before the register 10, 11 and 12. Multiplexers will also be placed before the subdivisions if these subdivisions exist.

C) three registers 16, 17 and 18 each comprising k cells. The registers 16, 17 and 18 are parallel output and serial input registers.

D) two multiplication circuits 19 and 20, each comprising one serial input, one parallel input and one serial output. The parallel input of the multiplication circuit 19 is connected to the output of the register 16 by means of a storage flip-flop circuit 21 having k cells. The parallel input of the multiplication circuit 20 is conlected to one of the outputs of the registers 17 or 18, by means of a storage flip-flop circuit 22 having k cells. This flip-flop circuit 22 is itself connected to one of the outputs of the registers 17 and 18 by means of a multiplexer 23 with two parallel inputs and one parallel output.

E) multiplexers 24, 25, 25', 26, 36 and 38.

F) a demultiplexer 39.

G) serial subtraction circuits 27, 28 and 29.

H) serial adder circuits 30 and 31.

I) delay circuits 32, 33 and 34 to delay the propagation of binary data elements by k cycles.

J) a storage circuit 35 to store the result of the comparison.

For further details, reference could be made to the European patent application up referred to (EP-0 601 907 A2) and especially to FIG. 3 of this application and to the passages in the description pertaining thereto: these are page 15, line 54, to page 16, line 13, and page 17, line 50, to page 18, line 55.

The circuit of FIG. 1 enables the invention to be implemented.

Hereinafter in the description, it shall be assumed that we have:

- a multiplicand A (binary data element) and a multiplier B (binary data element) encoded respectively on a and b words of k bits, the most significant words of A and B being non-zero,
- a modulo N (binary data element) encoded on m words of k bits, the modulo having (m–m') most significant words with k bits at zero, with $0<m'\leq m$.

The term "useful size" of a data element will be understood to mean the minimum number of words of k bits necessary and sufficient to represent a data element, namely the minimum number of words such that the most significant word has at least one bit equal to one. Thus: A and B, and N will have a useful size respectively equal to a, b and m'.

The term "number of useful bits" will be understood to mean the minimum number of bits necessary and sufficient to represent a data element, namely the minimum number of bits such that the most significant bit is equal to one.

Figure 2:
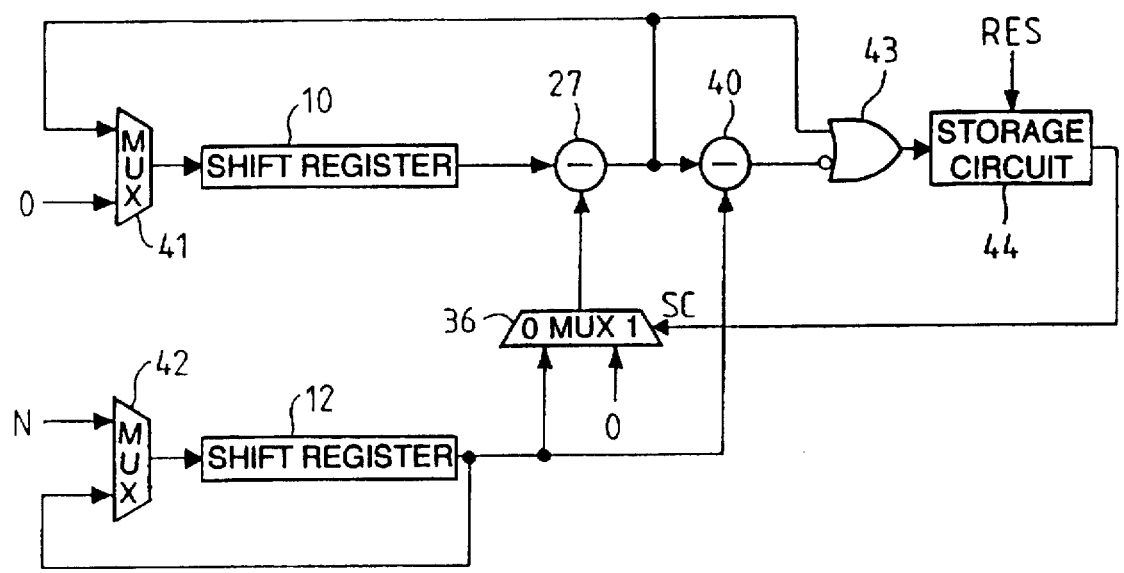
FIG. 2 shows a circuit implemented in the computation of an error correction parameter according to the invention.

FIG. 2 shows a circuit comprising:

the two shift registers 10 and 12, the subtraction circuit 27, the multiplexer 36, two multiplexers with two inputs 41 and 42, the respective outputs of which are connected respectively to the inputs of the registers 10 and 12, a serial subtraction circuit 40, a two-input NAND gate 43, a storage circuit 44 to store the result of the comparison.

The subtraction circuits 27 and 40 have two serial inputs and one serial output.

The subtraction circuit 27 has a first input connected to the output of the register 10. The output of this subtraction circuit 27 is connected to a first input of the subtraction circuit 40. The subtraction circuit 40 has its second input connected to the output of the register 12, and its output connected to an inverter input of the gate 43.

The other (non-inverter) input of the gate 43 is connected to the output of the subtraction circuit 27. Its output is connected to an input of the circuit 44. This circuit 44 has another input to receive a resetting signal RES.

The multiplexer 36 has two inputs and one output. Its output is connected to the second input of the subtraction circuit 28. Its inputs are connected respectively to the output of the register 12 and to a ground (potential corresponding to a logic 0). The multiplexer 36 selectively connects its output to its first or second input depending on the state of a selection signal SC received from the circuit 44 (for example to the first input if SC=0, and to the second input if SC=1).

The multiplexer 41 has its inputs connected respectively to the output of the subtraction circuit 27 and to the ground.

The multiplexer 42 has its inputs connected respectively to the output of the register 12 and to an input terminal for the serial reception of a binary data element (in practice, the modulo N).

The circuit of FIG. 2 is used to produce an error correction parameter H which is a binary data element.

It is desired to produce a binary data element representing A*B mod N.

Several methods can be envisaged.

If a+b>m':

The procedure will entail the following steps as shown in FIG. 3A.

P1) production of an error correction parameter $H = 2^{(a+b)*k} \mod N$ having a useful size smaller than or equal to m', and a parameter $J_0$ encoded on k bits, with $J_0=-N_0^{-1} \mod 2^k$, $N_0$ being the least significant bit of the modulo N, and storage of $J_0$ in a k-bit register 17 (step 50).

P2) loading of the parameter H into the register 10 and of the modulo N into the register 12, and initialization of the register 11 having n=m*k bits at zero, the contents of this register 11 being denoted S, with S as a variable binary data element encoded on n bits (step 51).

Figure 3B:
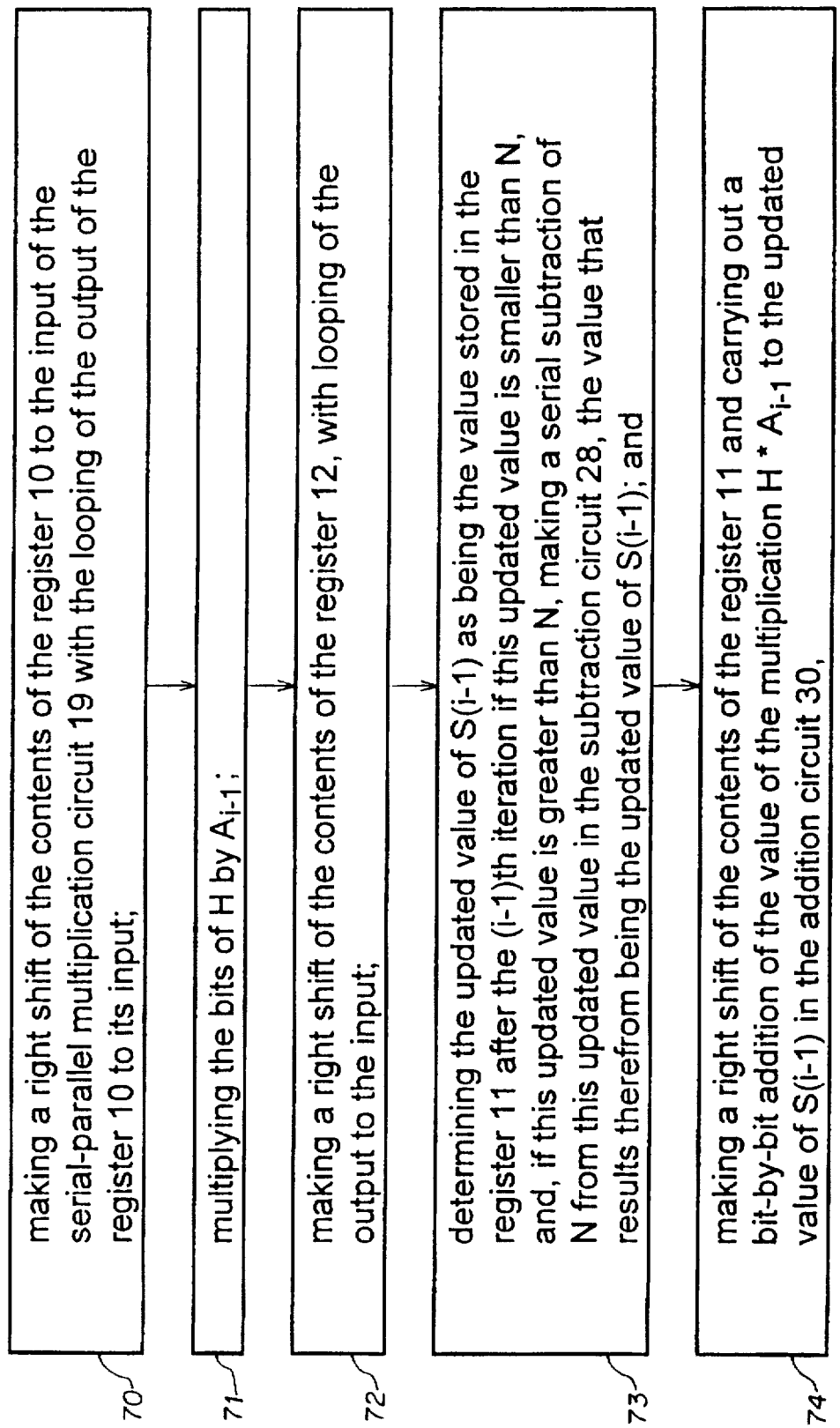

P3) setting up of a loop, indexed by i, with i varying from 1 to a, each $i^{th}$ iteration (step 52) comprising the following operations:

a) transfer of the $i^{th}$ word $A_{i-1}$ of the multiplicand A from the register 16 to the storage flip-flop circuit 21 (step 53), b) production of a value $X(i)=S(i-1)+H*A_{i-1}$, with $S(0)=0$ (n bits at zero) and $S(i-1)$ as the so-called updated value of S (step 54), defined hereinafter, by the steps of FIG. 3B, namely:

I—making a right shift of the contents of the register 10 to the input of the serial-parallel multiplication circuit 19 with the looping of the output of the register 10 to its input (step 70);

II—multiplying the bits of H by $A_{i-1}$ (step 71);

III—making a right shift of the contents of the register 12, with looping of the output to the input (step 72);

IV—determining the updated value of $S(i-1)$ as being the value stored in the register 11 after the (i-1)th iteration if this updated value is smaller than N, and, if this updated value is greater than N, making a serial subtraction of N from this updated value in the subtraction circuit 28, the value that results therefrom being the updated value of $S(i-1)$ (step 73); and V—making a right shift of the contents of the register 11 and calTying out a bit-by-bit addition of the value of the multiplication $H*A_{i-1}$ to the updated value of $S(i-1)$ in the addition circuit 30 (step 74), c) multiplication of the least significant word of X(i), $X_0(i)$ by $J_0$ in the multiplication circuit 20, and entering of the value $X_0(i)*J_0 \mod 2^k=Y_0(i)$ into the register 18 (step 55, FIG. 3A), and simultaneously the delaying of N and X(i) by k cycles in the delay circuits 32 and 34;

d) computation (step 56) of a value $Z(i)=X(i)+Y_0(i)*N$ by:

I—multiplying $Y_0(i)$ by N, delayed by k cycles, in the multiplication circuit 20, and II—adding X(i) to the value $Y_0(i)*N$, bit by bit in the addition circuit 31;

e) not taking account of the least significant word of Z(i) and storing the remaining words, namely $Z(i)/2^k$, in the register 11 (step 57).

f) comparing $Z(i)/2^k$ with N, bit by bit, in order to determine the updated value S(i) of the next iteration in the manner described here above, this comparison being made by the bit-by-bit subtraction of $Z(i)/2^k$ and N in the subtraction circuit 29, N having been delayed by k additional cycles in the delay circuit 33 (step 58).

g) the $i^{th}$ word of the multiplicand A being loaded into the register 16 at any point in time during the above operations (step 59).

P4) at the $a^{th}$ iteration, ignoring the least significant word of Z(a) and entering the remaining words, i.e. $Z(a)/2^k=A*2^{b*k} \mod N$ into the register 10 (step 60).

P5) repeating the steps P3 and P4 (step 61) in which:

B is substituted for A, and $Z(m)/2^k$ or $(Z(m)/2^k)-N$ is given by means of a third serial subtraction circuit 27 to the multiplication circuit 19, we have i varying from 1 to b.

P6) output of the result stored in the register 10 at the last iteration, possibly subtracted from N if necessary, by means of the subtraction circuit 27 (step 62).

In the above method, the register 16 is used p times, with p=a+b.

It will be noted that we could have a+b>2*m, and b>m', which was not possible in the prior mode of computation.

The computation time needed to obtain the desired result will be $(a+b)*(n+2*k+x)$ cycles instead of $2*m*(n+2*k+x)$ cycles in the prior art.

The term "cycle" is understood to mean the period of the clock signal synchronizing the operation of the circuit of FIG. 1.

In practice, x is a function of the initialization of the circuit, i.e. chiefly of the setting up of the control signals (of multiplexers for example) to ensure the consistent operation of the circuit.

As regards the production of the error correction parameter H, the procedure will comprise the following steps, described with reference to (FIG. 4).

H1) loading of the modulo N into the register 12 and initialization of the register 10, the contents of the second register being denoted B(0) (n=m*k bits at 0), and initialization of the register 44 (namely production of a signal RES such that SC=0) (step 80).

H2) output of N from the register 12 by right shifting, with looping of its output to its input, of 1 bits, with 1 being the number of useful bits of the modulo N, in order to have a most significant bit at 1 in the register 12 (step 81).

Figure 4B:
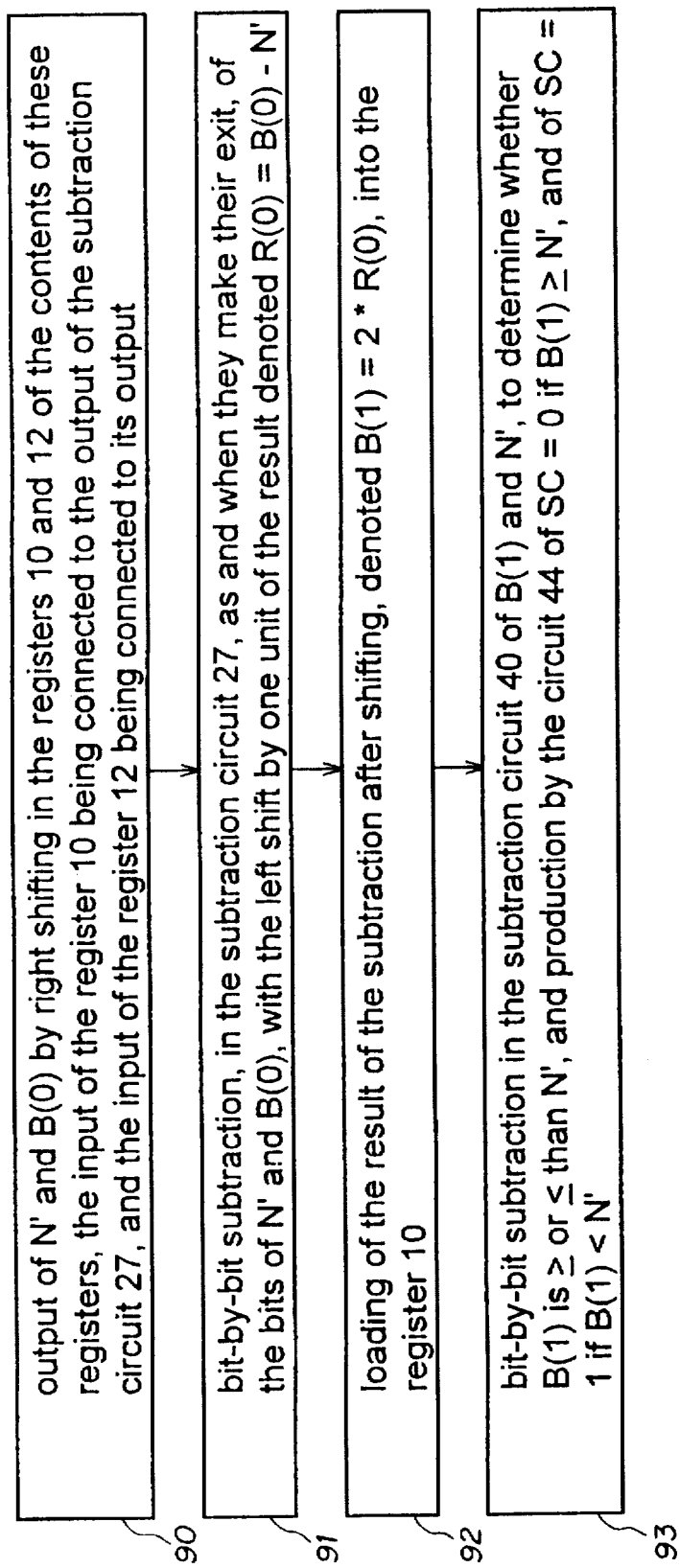

H3) production and storage of a data element $B(1)=2*(B(0)-N')$, encoded on n bits, with $N'=N*2^{n-1}$, N' corresponding to the binary data element stored in the register 12 (step 82), by the steps shown in FIG. 4B:

output of N' and B(0) by right shifting in the registers 10 and 12 of the contents of these registers, the input of the register 10 being connmected to the output of the subtraction circuit 27, and the input of the register 12 being connected to its output (step 90), bit-by-bit subtraction, in the subtraction circuit 27, as and when they make their exit, of the bits of N' and B(0), with the left shift by one unit of the result denoted R(0)=B(0)-N' (step 91), loading of the result of the subtraction after shifting, denoted B(1)=2*R(0), into the register 10 (step 92), bit-by-bit subtraction in the subtraction circuit 40 of B(1) and N', to determine whether B(1) is $\geq$ or $\leq$ than N', and production by the circuit 44 of SC=0 if $B(1) \geq N'$, and of SC=1 if B(1)<N' (step 93).

H4) production of a data element $H_{ini}=2^v \mod N'$ (step 83, FIG. 4A) with $v=n-1+m'*k+(a+b-m')*k/2^r$, with r as an integer such that $k/2^r$ is an integer, by:

setting up of a loop indexed by an index i, with i as an integer from 1 to v, each $i^{th}$ iteration comprising the following operations:

if B(i)<N', then loading into the register 10 of B(i+1)=2*(B(i)-0)=2*B(i), after left shifting by one unit and bit-by-bit comparison of B(i+1) and N' (step 84), else, bit-by-bit subtraction of N' and B(i), with left shift of the result by one unit and loading into the register 10 of B(i+1)=2*(B(i)-N'), and bit-by-bit comparison of B(i+1) and N' (step 85);

H5) if $B(v+1) \geq N'$: bit-by-bit subtraction of B(v+1) and N' in the substraction circuit 27, which gives 2*(B(v+1)-N') and loading of B(v+1)-N' into the register 10, necessitating a right shift by one unit (step 86).

H6) right shift of n-1 bits in the registers 10 and 12 (step 87).

H7) production of the parameter H (step 88) by the performance of r $P_{field}$ operations:

$H_{inf}(j)=P(H_{inf}(j-1), H_{inf}(j-1))_N$, withj as an index from 1 to r, and $H_{inf}(0)=B(v+1)*2^{1-n}$ or $(B(v+1)-N')*2^{1-n}$.

$H_{inf}(0)=2^{v1} \mod N$, with $v'=m'*k+(a+b-m')*k/2^r$.

We thus obtain $H=2^{(a+b)*k} \mod N$.

Figure 5B:
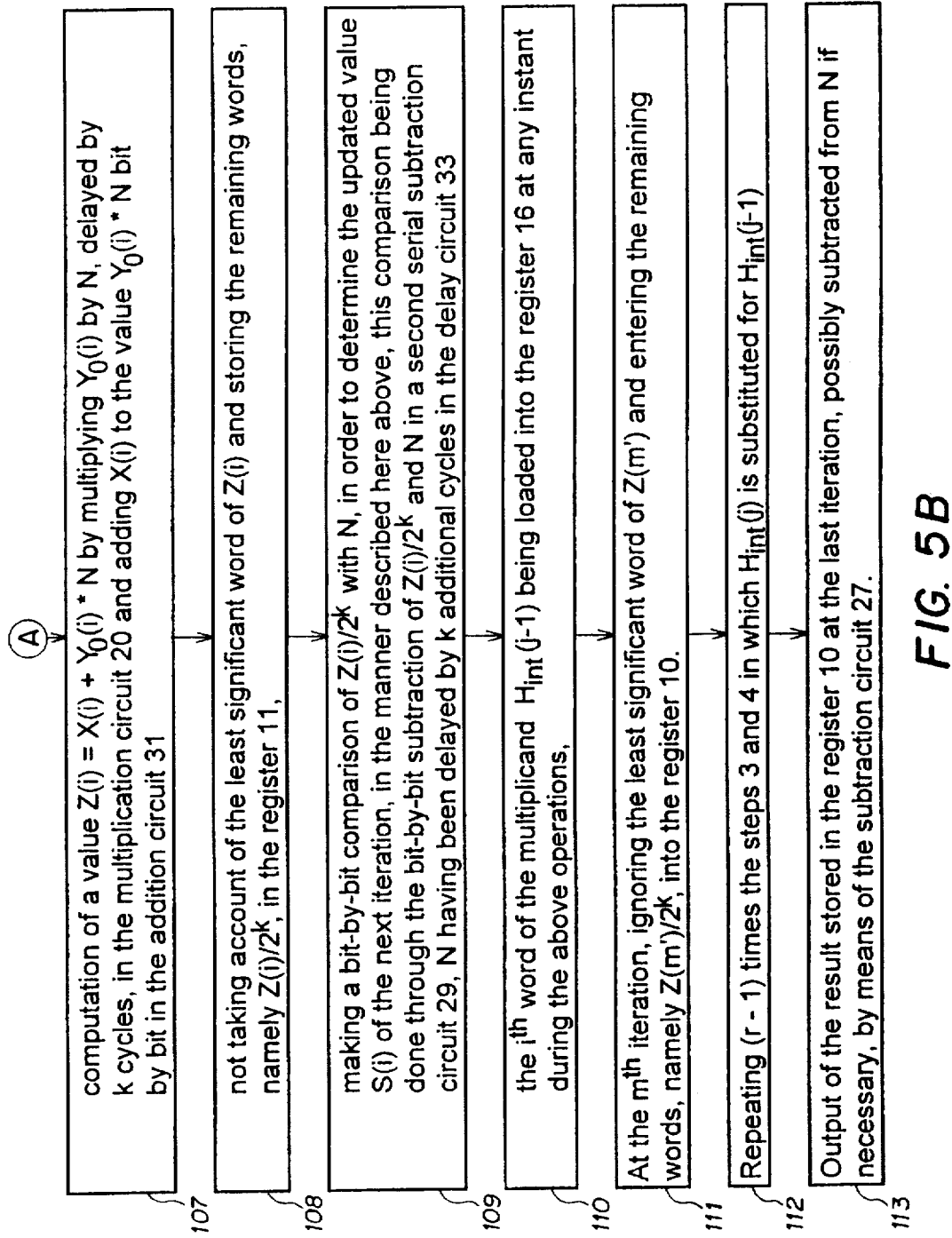

For the implementation of the $P_{field}$ operations, the procedure will comprise the following steps in FIG. 5:

let j=1 (step 100).

1. Production of a parameter $J_0$ encoded on k bits, with $J_0=-N_0^{-1} \mod 2^k$, $N_0$ being the least significant word of the modulo N, and storage of $J_0$ in the k-bit register 17 (step 101).

2. Initialization of the register 11 of n=m*k bits at zero, the contents of this register 11 being referenced S, with S as a variable binary data element encoded on n bits (step 102).

3. Setting up of a loop, indexed i, with i varying from 1 to m', each $i^{th}$ iteration comprising the following operations (step 103):

a) transfer of the $i^{th}$ word $H_{i-1}$ of the multiplicand $H_{int}(j-1)$ from the register 16 to the storage flip-flop circuit 21 (step 104).

b) production of a value $X(i)=S(i-1)+H*H_{i-1}$ with $S(0)=0$ and $S(i-1)$ as the so-called updated value of S (step 105).

c) multiplication of the least significant word of $X(i)$, $X_0(i)$, by $J_0$ in the multiplication circuit 20, and entering the value $X_0(i)*J_0$ mod $2^k=Y_0(i)$ into the register 18, and simultaneously delaying N and X(i) by k cycles in the delay circuits 32 and 34 (step 106).

d) computation (step 109) of a value $Z(i)=X(i)+Y_0(i)*N$ by:
  I—multiplying $Y_0(i)$ by N, delayed by k cycles, in the multiplication circuit 20; and
  II—adding X(i) to the value $Y_0(i)*N$ bit by bit in the addition circuit 31;

e) not taking account of the least significant word of Z(i) and storing the remaining words, namely $Z(i)/2^k$, in the register 11 (step 108).

f) making a bit-by-bit comparison of $Z(i)/2^k$ with N, in order to determine the updated value S(i) of the next iteration, in the manner described here above, this comparison being done through the bit-by-bit subtraction of $Z(i)/2^k$ and N in a second serial subtraction circuit 29, N having been delayed by k additional cycles in the delay circuit 33 (step 109).

g) the $i^{th}$ word of the multiplicand $H_{int}(j-1)$ being loaded into the register 16 at any instant during the above operations (step 110).

4. At the $m^{th}$ iteration, ignoring the least significant word of Z(m') and entering the remaining words, namely $Z(m')/2^k$, into the register 10 (step 111).

5. Repeating (r−1) times the steps 3 and 4 in which $H_{int}(j)$ is substituted for $H_{int}(j-1)$ (step 112).

6. Output of the result stored in the register 10 at the last iteration, possibly subtracted from N if necessary, by means of the subtraction circuit 27 (step 113).

As for the production of the parameter $J_0$, it could have been done prior to the implementation of the modular operations. Indeed, it is done by the central processing unit and is therefore independent of the coprocessor.

It will be noted that invention proposes the computation of an error correction parameter H by carrying out, firstly, subtractions smaller in number than in the known method and, secondly, $P_{field}$ operations. This makes it possible, if necessary, to reduce the time needed to carry out the step P1 of the multiplication method.

In the prior art method, the time needed to compute H was n*(n+1) cycles.

Figure 6:
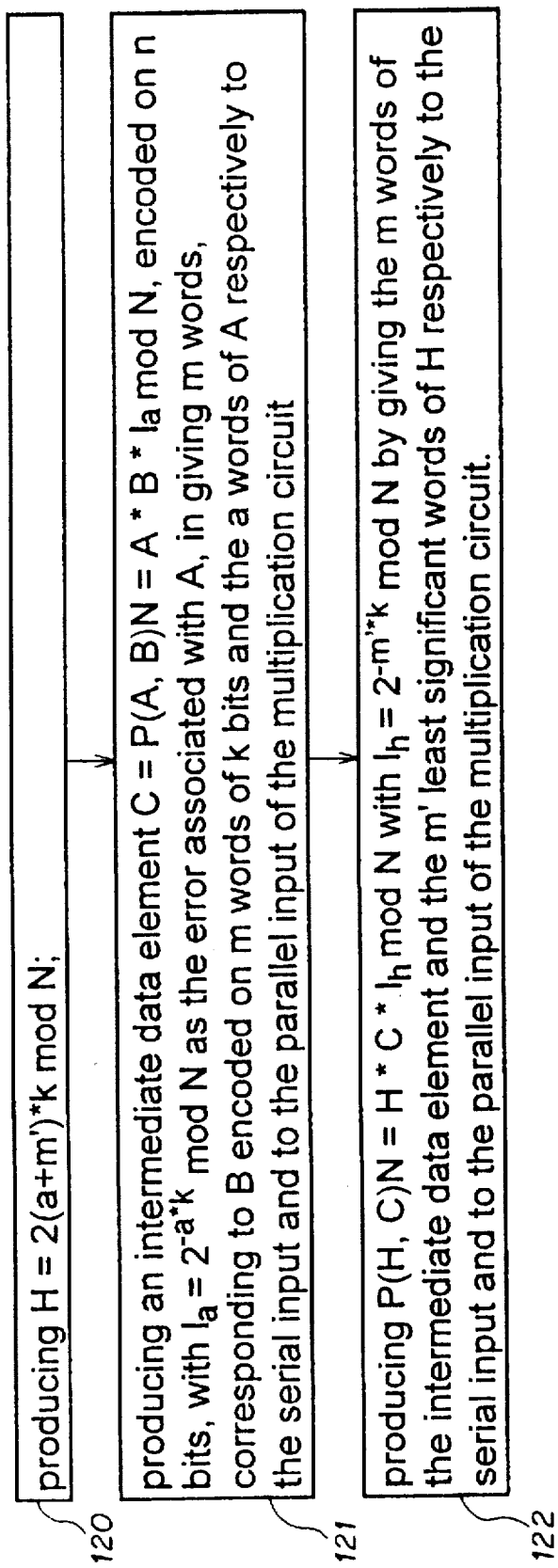
FIG. 6 illustrates yet another embodiment of the present invention.

According to the above method, the time needed is:

$$n*(m'*k-1+(a+b-m')*k/2^r+1)+r*m'*(n+2*k+x);$$

if a+b>m' and B<N;

If B is smaller than N, the above-described method could be modified by the steps shown in FIG. 6 of:

producing H=2(a+m')*k mod N (step 120);
 producing an intermediate data element C=P(A, B)N= $A*B*I_a$ mod N, encoded on n bits, with $I_a=2^{-a*k}$ mod N as the error associated with A, in giving m words, corresponding to B encoded on m words of k bits and the a words of A respectively to the serial input and to the parallel input of the multiplication circuit (step 121); and producing P(H, C)N=H*C*$I_h$ mod N with $I_h=2^{-m'*k}$ mod N by giving the m words of the intermediate data element and the m' least significant words of H respectively to the serial input and to the parallel input of the multiplication circuit (step 122).

Figure 7B:
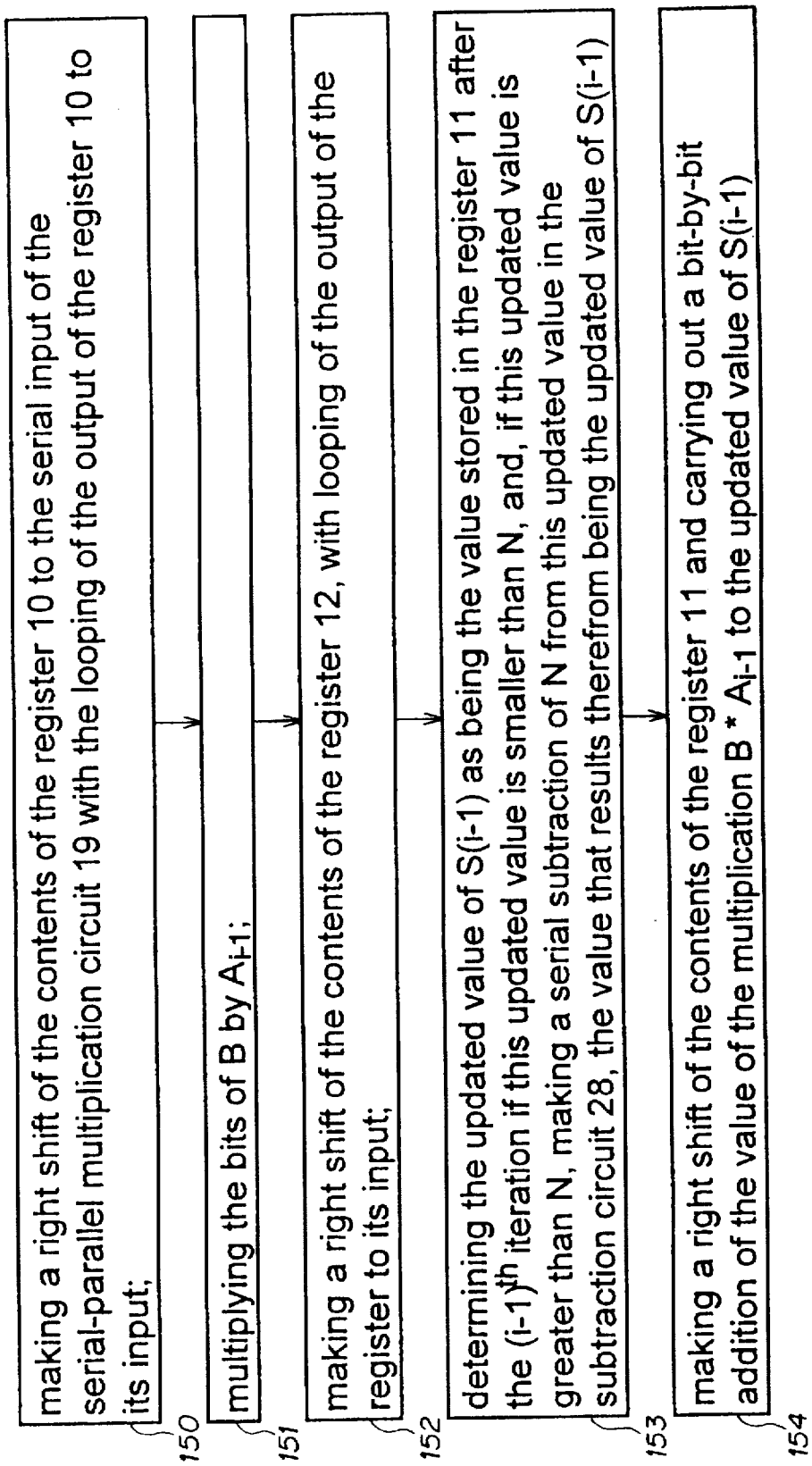

The method for implementing modular multiplication then comprises the following steps shown in FIGS. 7A and 7B:

P1) production of the error correction parameter H and of a parameter $J_0$ encoded on k bits, and storage of J0 in the register 17 (step 131).

P2) loading of the multiplier B and of the modulo N respectively into the registers 10 and 12, and initialization of the register 11 at zero, the contents of this register 11 being denoted S (step 131).

P3) setting up of a loop (step 132), indexed by i, with i varying from 1 to a, each $i^{th}$ iteration comprising the following operations:

a) transfer of the $i^{th}$ word $A_{i-1}$ of the multiplicand A from the register 16 to the storage flip-flop circuit 21 (step 133).

b) production (step 134) of a value $X(i)=S(i-1)+B*A_{i-1}$ with $S(0)=0$ and $S(i-1)$ as the so-called updated value of S, defined hereinafter, by (the steps in FIG. 7B:
  I—making a right shift of the contents of the register 10 to the serial input of the serial-parallel multiplication circuit 19 with the looping of the output of the register 10 to its input (step 150);
  II—multiplying the bits of B by $A_{i-1}$ (step 151);
  III—making a right shift of the contents of the register 12, with looping of the output of the register to its input (step 152);
  IV—determining the updated value of S(i−1) as being the value stored in the register 11 after the $(i-1)^{th}$ iteration if this updated value is smaller than N, and, if this updated value is greater than N, making a serial subtraction of N from this updated value in the subtraction circuit 28, the value that results therefrom being the updated value of S(i−1) (step 153); and
  V—making a right shift of the contents of the register 11 and carrying out a bit-by-bit addition of the value of the multiplication $B*A_{i-1}$ to the updated value of S(i−1) (step 154).

c) multiplication of the least significant word of X(i), $X_0(i)$ by $J_0$, and entering of the value $X_0(i)*J_0$ mod $2^k=Y_0(i)$ into the register 18, and simultaneously the delaying of N and X(i) by k cycles (step 135).

d) computation (step 136) of a value $Z(i)=X(i)+Y_0(i)*N$ by:
  I—multiplying $Y_0(i)$ by N, delayed by k cycles; and
  II—adding X(i) to the value $Y_0(i)*N$.

e) not taking account of the least significant word of Z(i) and storing the remaining words, namely $Z(i)/2^k$, in the register 11 (step 137).

f) comparing $Z(i)/2^k$ with N, bit by bit, in order to determine the updated value S(i) of the next iteration in the manner described here above (step 138).

g) the $i^{th}$ word of the multiplicand A being loaded into the register 16 at any point in time during the above operations (step 139).

P4) at the $a^{th}$ iteration, ignoring the least significant word of Z(a) and entering the remaining words into the register 10 (step 140).

P5) repeating the steps P3 and P4 132 and 140 in which:
H is substituted for A, and $Z(a)/2^k$ or $(Z(a)/2^k)$–N is given to the multiplication circuit 19.

we have i varying from 1 to m'(step 141).

P6) output of the result stored in the register 10 at the last iteration, possibly subtracted from N if necessary (step 142).

A could be encoded on a number a of words greater than m.

Figure 8B:
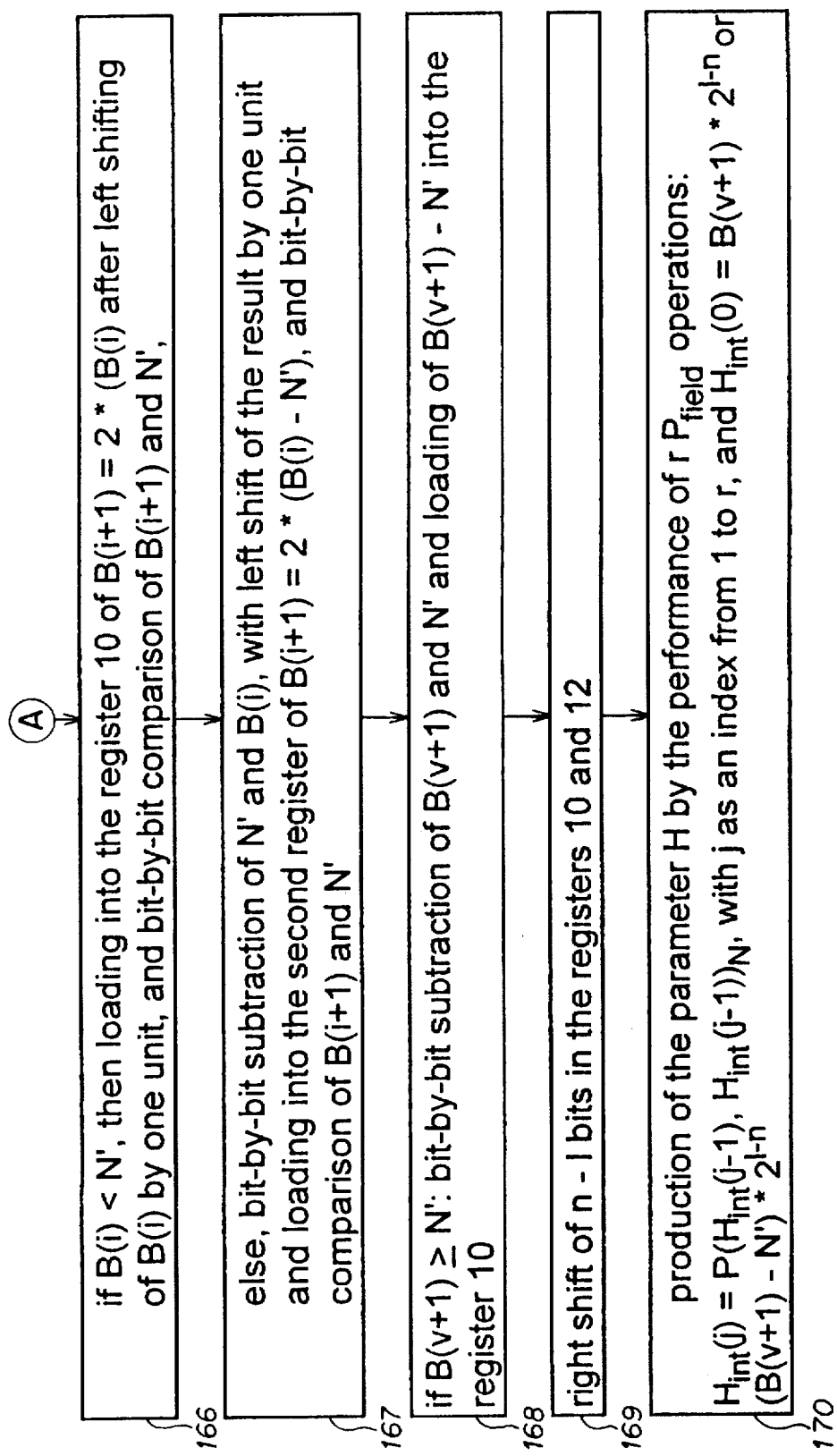

To compute H, the following procedure will be used (see FIG. 8):

H1) loading of the modulo N into the register 12, and initialization of the register 10 at zero, the contents of the register 10 being denoted B(0) (step 160).

H2) right shift, with looping of its output to its input, of 1 bits of the register 12, with 1 being the number of useful bits of the modulo (step 161).

H3) production and storage of a data element B(1)=2*(B(0)–N') (step 162), encoded on n bits, with $N'=N*2^{n-1}$, by:

right shifting (step 163) in the two registers and bit-by-bit subtraction of the contents of the registers, with left shift by one unit of the result, denoted R(0), of the bit-by-by subtraction, loading (step 164) of the result of the subtraction after shifting, denoted B(1), into the register 10, H4) production (step 165) of a data element $H_{int}=2^v$ mod N' with v=n–1+m'*k+a*k/2$^r$, with r as an integer such that k/2$^r$ is an integer, by:

setting up a loop indexed by an index i, with i as an integer from 1 to v, each $i^{th}$ iteration comprising the following operations:

if B(i)<N', then loading into the register 10 of B(i+1)=2*(B(i) after left shifting of B(i) by one unit, and bit-by-bit comparison of B(i+1) and N' (step 166), else, bit-by-bit subtraction of N' and B(i), with left shift of the result by one unit and loading into the second register of B(i+1)=2*(B(i)–N'), and bit-by-bit comparison of B(i+1) and N' (step 167), H5) if B(v+1)≧N': bit-by-bit subtraction of B(v+1) and N' and loading of B(v+1)–N' into the register 10 (step 168).

H6) right shift of n–1 bits in the registers 10 and 12 (step 169).

H7) production (step 170) of the parameter H by the performance of r P$_{field}$ operations:

$H_{int}(j)=P(H_{int}(j-1), H_{int}(j-1))_N$, with j as an index from 1 to r, and $H_{int}(0)=B(v+1)*2^{1-n}$ or $(B(v+1)-N')*2^{1-n}$.

For the different computations of H, it would be possible to take, for example, r=log$_2$(k)–1.

As compared with the method of producing H as seen here above, it will be noted that there is a modification of the parameter v in order to adapt the method to the present case.

if a+b<m':

It is then possible to single out two cases:

If a+b<m', then A*B mod N is produced by giving m words, corresponding to B* $2^{a*k}$ encoded on m words, and the a words of A respectively to the serial input and to the parallel input of the multiplication circuit 19.

if a+b =m' then

B*$2^{a*k}$ and N are compared, and if B*$2^{a*k}$<N, then A*B mod N is produced by giving m words, corresponding to B *$2^{a*k}$ encoded on m words, and the a words of A respectively to the serial input and to the parallel input of the multiplication circuit 19, else A*B mod N is produced by giving m words, corresponding to B*$2^{a*k}$ mod N encoded on m words, and the a words of A respectively to the serial input and to the parallel input of the multiplication circuit 19.

Thus it will not be required, in these conditions, to produce an error correction parameter H and only one computation operation will be used to obtain the result. The error correction is passed on to the operand B in replacing it by B*$2^{a*k}$ mod N, which corresponds to a simple left shift of B (matched as the case may be with a subtraction if B*$2^{a*k}$>N).

Thus P(A, B*$2^{a*k}$)$_N$=A*B mod N will be produced.

Here, it is possible to see how worthwhile it is to use the parallel input of the multiplication circuit 19 for a number of times that is independent of m.

As compared with the circuit such as it exists in the prior art, it will of course be necessary to modify the sequencing circuit producing the control signals needed for the working of the circuit illustrated in FIG. 1. Thus, it will be necessary to use a programmable counter in order to manage firstly the use of the register 16 as this register will be used a variable number of times. The use of this programmable counter will be necessary to manage secondly the shifts in the registers during the production of H as a function of the number of useftil bits of the modulo.

To carry out the comparisons of a, b and m enabling the choice of the fastest method, typically the central processing unit associated with the arithmetic coprocessor will be used.

These operations could be performed, as the case may be, by means of a circuit including subtraction and addition circuits specifically developed for this purpose.

In the circuit as it exists in the prior art, registers 10, 11 and 12 are used. These registers can be configured as registers of eight or sixteen 32-bit words. If it is desired to further reduce the computation time associated with a modular operation, it is possible to use registers that can be configured as registers of one to sixteen 32-bit words. This corresponds in practice to choosing m variable, for example such as m=m'. To do this, it is enough to add on supplementary multiplexers in the computation circuit at the registers 10, 11 and 12. This will make it possible, admittedly to the detriment of space availability, to reduce the time needed for shifts in the registers 10, 11 and 12 by adapting to the useful size of the binary data elements handled.

The management of the register 16, as envisaged here above, could be advantageously extended to the implementation of the following computations

RSA method

The RSA encryption method requires the performance of computations of the type C =M$^D$ mod N with M as a message to be encrypted or decrypted, N as a modulo such that N=P*Q, with P and Q as prime numbers and D such that D*E=1 mod ((P–1)*(Q–1)), with E being known.

One algorithm to perform this computation is the following:

A=(M mod P)$^{p \, mod \, (P-1)}$ mod P

B=(M mod Q)$^{p \, mod \, (Q-1)}$ mod Q

U=Q$^{-1}$mod P

If A<B mod P then

C=(((A+P–(B mod P))*U) mod P)*Q+B

Else

C=(((A–(B mod P))*U) mod P)*Q+B

This algonrith notably implements:

two modular reductions, two modular exponentiation operations,
one modular multiplication.

It will be particularly useful to be able to implement the methods of the invention to perform these computations as speedily as possible.

The inventor furthermore proposes to modify the registers used, for example by choosing registers that can be modulated and that may comprise, as desired, 32, 256, (256+ n), 384, (384+n), 512, or (512+n) cells with n as an integer. For example, the value taken will be n=32.

The trend is to the choice of modulo values encoded on 512, 768 and 1024 bits.

The choice of registers that can be modulated such as those defined here above provides for the following.

- in the general context of the modular operations, the minimizing of the number of shifts in the registers by adaptation with greater flexibility to the useful sizes of the data processed,
- in the more particular context of the implementation of RSA encoding, the ability to choose different sizes for P and Q. For example, if it is desired to have a modulo N=P*Q encoded on 512 bits, it is possible for example to choose P on 254 bits and Q on 258 bits. A 256-cell register will be used for the computations relating to P and a register of 256+n 288 cells will be used for computations relating to Q. With the prior art circuit, it would have been necessary to use a 512-cell register for the computations relating to Q. This would have been detrimental as regards the time taken to perform the computations.

Adaptation of the methods to an even-parity modulo

The coprocessor as used necessitates the choice of odd-parity modulo N values (least significant bits at 1). This is a necessity for the computation of $J_0$.

The inventor proposes to extend the above-described methods to the performance of operations of modular multiplication with an even-parity modulo.

Although it has not been specified, it is of course clear that modular operations are worthwhile only if N does not have all its bits at 0.

If N is a even parity value and not zero, it is always possible to find a binary data element N' such that $N=N'*2^g$, with N' as an odd-parity value and $1>g>1$.

Since the useful size of N' is smaller than that of N, it may be considered that N' is encoded on m' words of k bits. It may also be possible to consider the real useful size m" (in words) of N'. The last-mentioned option is of course the most worthwhile one if it is desired to optimize the duration of the modular operations to the utmost.

The operations will be implemented by assuming that the modulo is N', producing $A*B*2^{-g}$ mod N' and multiplying this result by 2g (either by software methods within the central processing unit or by shifting in a register).

if a+b>m"

The following is the method:

$H=2^{(a+b)*k-g}$ mod N' is produced, there is produced an intermediate data element $P(A, H)N'=A*2^{b*k-g}$ mod N', encoded on n bits, by giving m words, corresponding to H encoded on m words, and the a words of A respectively to the serial input and to the parallel input of the multiplication circuit, and $A*B*2^{-g}$ mod N' is produced by giving the m words of the intermediate data element and the b words of B respectively to the serial input and to the parallel input of the multiplication circuit.

$A*B$ mod N are produced by shifting.

The last shift will be done physically or not physically depending on whether it is a register or the central processing unit that will be used.

It is of course necessary to modify the production of H accordingly.

Advantageously, the following procedure will be used:

H1) loading of the modulo N' (or N) into the register 12 and initialization of the register 10, the contents of the second register being denoted B(0) (n=m*k bits at 0), and initialization of the register 44 (namely production of a signal RES such that SC=0).

H2) output of N' from the register 12 by the right shifting, with looping of its output to its input, of 1–g bits (or 1 bits), with 1 being the number of useful bits of the modulo N, in order to have a most significant bit at 1 in the register 12.

H3) production and storage of a data element B(1)=2*(B (0)–N"), encoded on n bits, with $N"=N'*2^{n-1+g}$, N" corresponding to the binary data element stored in the register 12, by:

output of N" and B(0) by right shifting in the registers 10 and 12 of the contents of these registers, the input of the register 10 being connected to the output of the subtraction circuit 27, and the input of the register 12 being connected to its output, bit-by-bit subtraction, in the subtraction circuit 27, as and when they make their exit, of the bits of N" and B(0), with left shift by one unit of the result denoted R(0)= B(0)–N", loading of the result of the subtraction after shifting, denoted B(1)=2*R(0), into the register 10, bit-by-bit subtraction in the subtraction circuit 40 of B(1) and N", to determine whether B(1) is ≧ or < than N", and production by the circuit 44 of SC=0 if B(1)≧N", and of SC=1 if B(1)<N".

H4) production of a data element $H_{int}=2^v$ mod N" with v=n–1+m'*k+(a+b–m')*k/2ʳ, with r as an integer such that k/2ʳ is an integer, by:

setting up of a loop indexed by an index i, with i as an integer from 1 to v, each $i^{th}$ iteration comprising the following operations:

if B(i)<N", then loading into the register 10 of B(i+1)= 2*(B(i)–0)=2*B(i), after left shifting by one unit and bit-by-bit comparison of B(i+1) and N", else, bit-by-bit subtraction of N" and B(i), with left shift of the result by one unit and loading into the register 10 of B(i+1)=2*(B(i)–N"), and bit-by-bit comparison of B(i+1) and of N".

H5) if B(v+1)≧N": bit-by-bit subtraction of B(v+1) and N" in the substraction circuit 27, which gives 2*(B(v+1)– N") and loading of B(v+1)–N" into the register 10, necessitating a right shift by one unit.

H6) right shift of n–1 bits in the registers 10 and 12.

H7) performance of r $P_{field}$ operations:

$H_{int}(j)=P(H_{int}(j-1), H_{int}(j-1))_{N'}$, with j as an index from 1 to r, and $H_{int}(0)=B(v+1)* 2^{1-n}$ or $(B(v+1)-N")*2^{1-n}$.

$H_{int}(0)=2^{v'}$ mod N, with v'=m'*k+(a+b–m')*k/2ʳ.

We thus obtain $2^{(a+b)*k}$ mod N'.

H8) production of the parameter H by:

the production of $2^{u*k-g}$ mod N' with u as an integer such that u*k>g>(u–1)*k.

the performance of a $P_{field}$ operation to obtain $$H=P(2^{u*k-g} \bmod N', 2^{(a+b)*k} \bmod N')_{N'}$$

if a+b≧m" and B≦N':

The following is the method:

$H=2^{(a+m')*k-g}$ mod N' is produced, there is produced an intermediate data element $P(A, B)_{N'}=A*B*2^{-a*k}$ mod N' encoded on n bits, by giving m words, corresponding to B encoded on m words, and the a words of A respectively to the serial input and to the parallel input of the multiplication circuit, and $A*B*2^{-g}$ mod N' is produced by giving the m words of the intermediate data element and the m" least significant words of H respectively to the serial input and to the parallel input of the multiplication circuit.

A*B mod N are produced by shifting.

It would have been possible to compute $H=2^{(a+m')*k-g}$ mod N'. This would correspond to considering the useful size of N instead of the useful size of N', which is not judicious if g is such that m"<m'.

For the production of H, reference will be made to the steps described here above concerning firstly the case where a+b>m" with N as an even-parity value and secondly to the case where a+b>m' and B<N with N as an odd-parity value. The adapting will be done without any particular problems for those skilled in the art.

if a+b<m":

The following procedure will be followed:

if a+b<m", then $A*B*2^{-g}$ mod N' will be produced by giving m words, corresponding to $B*2^{a*k-g}$ encoded on m words, and the a words of A respectively to the serial input and to the parallel input of the multiplication circuit 19.

if a+b=m" then $B*2^{a*k-g}$ and N' are compared, and if $B*2^{a*k-g}$<N', then $A*B*2^{-g}$ mod N' is produced by giving m words, corresponding to $B*2^{a*k-g}$ encoded on m words, and the a words of A respectively to the serial input and to the parallel input of the multiplication circuit 19.

else $A*B*2^{-g}$ mod N' is produced by giving m words, corresponding to $B*2^{a*k-g}$ mod N' encoded on m words, and the a words of A respectively to the serial input and to the parallel input of the multiplication circuit 19.

A*B mod N is produced by shifting.

The invention is particularly advantageous inasmuch as it can be implemented (as regards methods) without modifying the existing circuits shown in FIGS. 1 and 2. All that is modified is the sequencing operation enabling the production of the different control signals necessary for the functioning of these circuits. In particular, the invention entails taking account of the useful sizes of the modulo N and of the operands. Advantageously, the methods of the invention will be used by the modification, as indicated here above, of the circuit 1.

It has been assumed in FIG. 2 that resources of the circuit of FIG. 2 are used. This enables the overall size of the coprocessor to be reduced to the minimum. Of course, a circuit dedicated solely to the computation of H could be used.

Of course, it will be understood that the modifications introduced by the invention can be applied to the obtaining of modular squares and hence to the performance of modular exponentiation operations.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for implementing modular multiplication according to the Montgomery method, wherein a multiplicand A and a multiplier B are encoded respectively using a number a and a number b of words of k bits, wherein the most significant words of A and B are non-zero, a modulo N is encoded using m words of k bits, the modulo having (m−m') most significant words with k zero bits, with 0<m'≦m, comprising the step of:

multiplying in a multiplication circuit having a serial input to receive data elements encoded using at least m' words of k bits, a parallel input to receive encoded words of k bits, and a serial output; and wherein, during the step of multiplying, a predetermined number p of words is applied successively to the parallel input of the multiplication circuit, wherein p is not an integer multiple of m and is greater than or equal to the number a.

2. The method of claim 1, further comprising a step of producing an error correction parameter $H=2^{(p*k)}$ mod N encoded using m words of k bits.

3. The method of claim 2, wherein B is less than or equal to N, further comprising the steps of:

producing an intermediate data element P(A, B)N encoded on m words of k bits applying m words corresponding to B encoded using m words of k bits, and the a words of A respectively to the serial input and to the parallel input of the multiplication circuit; and producing A*B mod N by applying the m words of the intermediate data element and the m' least significant words of H respectively to the serial input and to the parallel input of the multiplication circuit.

4. The method of claim 3, further comprising the steps of:

P1) producing the error correction parameter H and a parameter $J_0$ encoded on k bits, and storing $J_0$ in a k-bit register;

P2) loading of the multiplier B and of the modulo N into first and second respective n-bit registers, with n=m*k, and initialization of a third n-bit register at zero, the contents of this third register being denoted S;

P3) setting up of a loop, indexed by i, with i varying from 1 to a, wherein each $i^{th}$ iteration comprises the steps of:

a) transferring the ith word $A_{i-1}$ of the multiplicand A from a fourth register to a storage flip-flop circuit;

b) producing a value $X(i)=S(i-1)+B*A_{i-1}$ with $S(0)=0$ and S(i-1) as an updated value of S, by:

I—making a right shift of the contents of the first register to the input of a first serial-parallel multiplication circuit with the looping of the output of the first register to its input;

II—multiplying the bits of B by $A_{i-1}$;

III—making a right shift of the contents of the second register, with looping of the output of the register to its input;

IV—determining the updated value of S(i−1) as being the value stored in the third register after the $(i-1)^{th}$ iteration if this updated value is smaller than N, and, if this updated value is greater than N, making a serial subtraction of N from this updated value, the value that results therefrom being the updated value of S(i−1); and V—making a right shift of the contents of the third register and carrying out a bit-by-bit addition of the value of the multiplication $B*A_{i-1}$ to the updated value of $S(i-1)$;

c) multiplying the least significant word of $X(i)$, $X_0(i)$ by $J_0$, and entering of the value $X_0(i)*J_0 \bmod 2^k = Y_0$ (i) into a register, and simultaneously the delaying of $N$ and $X(i)$ by $k$ cycles;

d) computing a value $Z(i)=X(i)+Y_0(i)*N$ by:
   I—multiplying $Y_0(i)$ by $N$, delayed by $k$ cycles; and
   II—adding $X(i)$ to the value $Y_0(i)*N$;

e) not taking account of the least significant word of $Z(i)$ and storing the remaining words, namely $Z(i)/2^k$, in the third register;

f) comparing $Z(i)/2^k$ with $N$, bit by bit, in order to determine the updated value $S(i)$ of the next iteration;

g) loading the $i^{th}$ word of the multiplicand $A$ into the fourth register;

P4) at the $a^{th}$ iteration, ignoring the least significant word of $Z(a)$ and entering the remaining words into the first register;

P5) repeating the steps P3 and P4 in which:
H is substituted for A, and $Z(a)/2^k$ or $(Z(a)/2^k)-N$ is given to the first multiplication circuit;
wherein i varies from 1 to b; and P6) outputting the result stored in the first register at the last iteration, possibly subtracted from N if necessary.

5. A method according to claim 4, wherein the production of the parameter H in the first step comprises the steps of:

H1) loading the modulo N into a first n-bit register with $n=m*k$, and initialization of a second n-bit register at zero, the contents of the second register being denoted $B(0)$;

H2) right shifting, with looping of the output to the input, 1 bits of the first register, with 1 being the number of useful bits of the modulo;

H3) producing and storing a data element $B(1)=2*(B(0)-N')$, encoded on n bits, with $N'=N*2^{n-1}$, by:
right shifting in the two registers and bit-by-bit subtraction of the contents of the first and second registers, with left shift by one unit of the result, denoted $R(0)$, of the bit-by-by subtraction;
loading the result of the subtraction after shifting, denoted $B(1)=2*R(0)$, into the second register;
comparison of $B(1)$ and $N'$;

H4) producing a data element $H_{int}=2^v \bmod N'$ with $v=n-1+m'*k+a*k/2^r$, with r as an integer such that $k/2^r$ is an integer, by:
setting up a loop indexed by an index i, with i as an integer from 1 to v, wherein each $i^{th}$ iteration comprises the steps of:
if $B(i)<N'$, then loading into the second register of $B(i+1)=2*B(i)$ after left shifting of $B(i)$ by one unit, and bit-by-bit comparison of $B(i+1)$ and $N'$;
else, subtracting bit-by-bit $N'$ and $B(i)$, with left shifting of the result by one unit and loading into the second register of $B(i+1)=2*(B(i)-N')$, and bit-by-bit comparison of $B(i+1)$ and $N'$;

H5) if $B(v+1) \geq N'$ then subtracting bit-by-bit $B(v+1)$ and $N'$ and loading of $B(v+1)-N'$ into the second register;

H6) right shifting $n-1$ bits in the first and second registers; and

H7) producing the parameter H by the performance of r $P_{fied}$ operations:
$H_{int}^{fied}(j)=P(H_{int}(j-1), H_{int}(j-1))_N$, with j as an index from 1 to r, and $H_{int}(0)=B(v+1)*2^{1-n}$ or $(B(v+1)-N')*2^{1-n}$.

6. The method of claim 1, further comprising the steps of:
producing an error correction parameter $H=2^{(a+b)*k} \bmod N$;
producing an intermediate data element $P(A, H)_N$ encoded using m words of k bits by applying the m words of H and the a words of A respectively to the serial input and to the parallel input of the multiplication circuit; and
computing $A*B \bmod N$ by applying the m words of the intermediate data element and the b words of B respectively to the serial input and to the parallel input of the multiplication circuit.

7. The method of claim 6, further comprising the steps of:

P1) producing a parameter $J_0$, and storing the parameter $J_0$ in a k-bit register;

P2) loading the parameter H and the modulo N respectively into first and second respective registers having n bits, with $n=m*k$, and initializing a third n-bit register to zero, wherein the third register has contents S;

P3) establishing a loop, indexed by i, with i varying from 1 to a, wherein each $i^{th}$ iteration comprises the steps of:
a) transferring the ith word $A_{i-1}$ of the multiplicand A from a fourth register to a storage flip-flop circuit;
b) producing a value $X(i)=S(i-1)+H*A_{i-1}$ with $S(0)=0$ and $S(i-1)$ as an updated value of S by the steps of:
I—making a right shift of the contents of the first register to the input of a first serial-parallel multiplication circuit with the looping of the output of the first register to its input;
II—multiplying the bits of H by $A_{i-1}$;
III—making a right shift of the contents of the second register, with looping of the output of the register to its input;
IV—determining the updated value of $S(i-1)$ as the value stored in the third register after the $(i-1)^{th}$ iteration if the updated value is smaller than N, and, if the updated value is greater than N, making a serial subtraction of N from the updated value, the value that results therefrom being the updated value of $S(i-1)$; and
V—making a right shift of the contents of the third register and carrying out a bit-by-bit addition of the value of the multiplication $H*A_{i-1}$ to the updated value of $S(i-1)$;

c) multiplying $X_0$ (i), the least significant word of $X(i)$, by $J_0$, and entering of the value $X_0(i)*J_0 \bmod 2^k=Y_0$ (i) into a register, and simultaneously delaying N and $X(i)$ by k cycles;

d) computing a value $Z(i)=X(i)+Y_0(i)*N$ by:
I—multiplying $Y_0(i)$ by N, delayed by k cycles; and
II—adding $X(i)$ to the value $Y_0(i)*N$;

e) dropping the least significant word of $Z(i)$ and storing the remaining words, $Z(i)/2^k$, in the third register;

f) comparing $Z(i)/2^k$ with N, bit by bit, in order to determine the updated value $S(i)$ of the next iteration;

g) loading the $i^{th}$ word of the multiplicand A into the fourth register at any time during an iteration;

P4) at the $a^{th}$ iteration, dropping the least significant word of $Z(a)$ and entering the remaining words into the first register;

P5) repeating the steps P3 and P4 in which:
B is substituted for A, and $Z(a)/2^k$ or $(Z(a)/2^k)-N$ is applied to the first multiplication circuit;
wherein i varies from 1 to b; and P6) outputting the result stored in the first register at the last iteration.

8. The method of claim 7, wherein the step of producing the parameter H comprises the steps of:

H1) loading of the modulo N into a first n-bit register with n=m*k, and initialization of a second n-bit register at zero, the contents of the second register being denoted B(0);

H2) right shifting, with looping of its output to its input, 1 bit of the first register, wherein 1 is a number of useful bits of the modulo N;

H3) producing and storing a data element $B(1)=2*(B(0)-N')$, encoded using n bits, with $N'=N*2^{n-1}$, by the steps of:
right shifting in the two registers and bit-by-bit subtraction of the contents of the first and second registers, with left shift by one unit of the result, denoted R(0), of the bit-by-by subtraction;
loading the result of the subtraction after shifting, denoted B(1), into the second register;
comparing B(1) and N';

H4) producing a data element $H_{int}=2^v$ mod N' with $v=n-1+m'*k+(a+b-m')*k/2^r$, with r as an integer such that $k/2^r$ is an integer, by:
setting up a loop indexed by an index i, with i as an integer from 1 to v, wherein each $i^{th}$ iteration comprises the steps of:
if B(i)<N', then loading into the second register of B(i+1)=2*B(i) after left shifting of B(i) by one unit, and bit-by-bit comparison of B(i+1) and N',
else, performing bit-by-bit subtraction of N' and B(i), with left shift of the result by one unit and loading into the second register of B(i+1)=2*(B(i)–N'), and bit-by-bit comparison of B(i+1) and N';

H5) when B(v+1)≧N', performing bit-by-bit subtraction of B(v+1) and N' and loading of B(v+1)–N' into the second register;

H6) right shifting n–1 bits in the first and second registers;

H7) producing the parameter H by the performance of r $P_{field}$ operations:
$H_{int}^{new}(j)=P(H_{int}(j-1), H_{int}(j-1))_{N'}$, with j as an index from 1 to r, and $H_{int}(0)=B(v+1)*2^{1-n}$ or $(B(v+1)-N')*2^{1-n}$.

9. A method according to claim 1, wherein (a+b) and m' are compared, and
if a+b<m', then A*B mod N is produced by giving m words, corresponding to $B*2^{a*k}$ encoded on m words, and the a words of A respectively to the serial input and to the parallel input of the multiplication circuit;
if a+b=m' then
$B*2^{a*k}$ and N are compared; and
if $B*2^{a*k}$<N, then A*B mod N is produced by giving m words, corresponding to $B*2^{a*k}$ encoded on m words, and the a words of A respectively to the serial input and to the parallel input of the multiplication circuit;
else A*B mod N is produced by giving m words, corresponding to $B*2^{a*k}$ mod N encoded on m words, and the a words of A respectively to the serial input and to the parallel input of the multiplication circuit.

10. A method according to claim 1, further comprising a step of producing an error correction parameter $H=2^{(p*k)}$ mod N' encoded on m words of k bits, with N' as a binary data element such that $N=N'*2^g$ and N', such that the least significant bit is 1.

11. A method according to claim 10, further comprising the steps of:
producing $H=2^{(a+b)*k-g}$ mod N',
producing an intermediate data element $P(A, H)_{N'}$ encoded on n bits, by applying the m words of H encoded and the a words of A respectively to the serial input and to the parallel input of the multiplication circuit;
producing $P(B, P(A, H)_{N'})_{N'}$ by applying the m words of the intermediate data element and the b words of B respectively to the serial input and to the parallel input of the multiplication circuit; and
producing A*B mod N by shifting $P(B, P(A, H)_{N'})_{N'}$.

12. A method according to claim 11, wherein the production of the parameter H comprises the steps of:

H1) loading the modulo N' into a first n-bit register and initializing a second n-bit register at zero, the contents of the second register being denoted B(0);

H2) right shifting the contents of the first register, with looping of its output to its input, of 1–g bits of the first register, with 1 being the number of useful bits of the modulo N;

H3) producing and storing a data element $B(1)=2*(B(0)-N'')$, encoded on n bits, with $N''=N'*2^{n-1+g}$, by:
right shifting in the first and second registers of the contents of these registers;
bit-by-bit subtraction, as and when they make their exit, of the contents of said two registers with the left shift by one unit of the result denoted R(0) of the subtraction;
loading of the result of the subtraction after shifting, denoted B(1), into the second register;
comparison of B(1) and N'';

H4) producing a data element $H_{int}=2^v$ mod N'' with $v=n-1+m'*k+(a+b-m')*k/2^r$, with r as an integer such that $k/2^r$ is an integer, by the steps of:
setting up a loop indexed by an index i, with i as an integer from 1 to v, wherein each $i^{th}$ iteration comprises the steps of:
if B(i)<N'', then loading into the second register of B(i+1)=2*B(i) after left shifting of B(i) by one unit, and bit-by-bit comparison of B(i+1) and N'';
else, subtracting bit-by-bit N'' and B(i), with left shifting of the result by one unit and loading into the second register of B(i+1)=2*(B(i) –N''), and bit-by-bit comparison of B(i+1) and N'';

H5) if B(v+1)≧N'' then subtracting bit-by-bit B(v+1) and N'', and loading B(v+1)–N'' into the second register;

H6) right shifting n–1 bits in the first and second registers;

H7) performance r $P_{field}$ operations:
$H_{int}(j)=P(H_{int}(j-1), H_{int}(j-1))_{N'}$, with j as an index from 1 to r, and $H_{int}(0)=B(v+1)*2^{1-n}$ or $(B(v+1)-N'')*2^{1-n}$; and H8) left shifting g bits of $H_{int}(r)$.

13. A method according to claim 11 wherein, B being lower than or equal to N':
producing $H=2^{(a+m'')*k-g}$ mod N', with m'' as the useful size of N' in words,
producing an intermediate data element $P(A,B)_{N'}$ encoded on n bits, corresponding to B encoded on m words, and the a words of A respectively to the serial input and to the parallel input of the multiplication circuit;
producing $P(H,P(A,B)_{N'})_{N'}$ by applying the m words of the intermediate data element and the m'' words of H respectively to the serial input and to the parallel input of the multiplication circuit; and
producing A*B mod N by shifting $P(H,P(A,B)_{N'})_{N'}$.

14. A method according to claim 10, wherein (a+b) and m'' are compared, with m'' as the useful size in words of N'; and further comprising the steps of:
if a+b<m'', then producino A*B*$2^{-g}$ mod N' by applying m words, corresponding to $B*2^{a*k-g}$ encoded on m words, and the a words of A respectively to the serial input and to the parallel input of the multiplication circuit;

if a+b=m", then comprising $B*2^{a*k-g}$ and N'; and if $B*2^{a*k-g}<N'$, then producing $A*B*2^{-g}$ mod N' by applying m words, corresponding to $B*2^{a*k-g}$ encoded on m words, and the a words of A respectively to the serial input and to the parallel input of the multiplication circuit;

else producing $A*B*2^{-g}$ mod N' by applying m words, corresponding to $B*2a*k-g$ mod N' encoded on m words, and the a words of A respectively to the serial input and to the parallel input of the multiplication circuit; and producing A*B mod N by shifting the data element produced following the comparison.

15. The method of claim 1, wherein m is variable.

* * * * *